United States Patent
Milligan et al.

(10) Patent No.: US 10,766,601 B2
(45) Date of Patent: Sep. 8, 2020

(54) AIRCRAFT WING FLAPS HAVING AERODYNAMIC RESTORATION DOORS

(71) Applicant: The Boeing Company, Chicago, IL (US)

(72) Inventors: Eric Milligan, Seatle, WA (US); Bryan Jacob Gruner, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 381 days.

(21) Appl. No.: 15/824,466

(22) Filed: Nov. 28, 2017

(65) Prior Publication Data

US 2019/0161165 A1  May 30, 2019

(51) Int. Cl.
| | | |
|---|---|---|
| *B64C 3/50* | (2006.01) | |
| *B64C 9/02* | (2006.01) | |
| *B64C 9/16* | (2006.01) | |
| *B64C 3/18* | (2006.01) | |

(52) U.S. Cl.
CPC .............. *B64C 9/02* (2013.01); *B64C 3/187* (2013.01); *B64C 9/16* (2013.01)

(58) Field of Classification Search
CPC .............. B64C 3/187; B64C 9/02; B64C 9/16
USPC ....................................................... 244/228
See application file for complete search history.

(56) References Cited

U.S. PATENT DOCUMENTS

| | | | |
|---|---|---|---|
| 4,131,252 A | 12/1978 | Dean et al. | |
| 4,576,347 A | 3/1986 | Opsahl | |
| 2012/0234975 A1* | 9/2012 | Timm | B64C 7/00 244/130 |
| 2015/0321747 A1* | 11/2015 | Recksiek | B64C 9/04 244/201 |
| 2017/0175895 A1* | 6/2017 | Vincent | B64C 9/02 |
| 2017/0248204 A1* | 8/2017 | Simmons | F16H 7/08 |

FOREIGN PATENT DOCUMENTS

EP     3034392     6/2016

OTHER PUBLICATIONS

European Patent Office, "Extended European Search Report," issued in connection with European Patent Application No. 18205391.8, dated Mar. 27, 2019, 7 pages.

* cited by examiner

*Primary Examiner* — Claude J Brown
(74) *Attorney, Agent, or Firm* — Hanley, Flight & Zimmerman, LLC

(57) ABSTRACT

Aircraft wing flaps having aerodynamic restoration doors are described. An example apparatus includes a door to be rotatably coupled to a closure rib of a flap of an aircraft wing. The door is to be moveable between a deployed position and a retracted position. The flap has a leading edge and a cutout formed in the leading edge. The door is to fill a portion of the cutout when the door is in the deployed position.

20 Claims, 16 Drawing Sheets

AIRCRAFT WING FLAPS HAVING AERODYNAMIC RESTORATION DOORS

FIELD OF THE DISCLOSURE

This disclosure relates generally to aircraft wing flaps and, more specifically, to aircraft wing flaps having aerodynamic restoration doors.

BACKGROUND

Aircraft wings (e.g., the wings of a commercial aircraft) commonly include flaps (e.g., outboard flaps and/or inboard flaps) that are movable relative to the aircraft wings between stowed and deployed positions. Deploying the flaps from the aircraft wings during flight typically increases a lift characteristic associated with the aircraft wings, while stowing the flaps during flight typically reduces the lift characteristic. Aircraft wings may include deflection control ribs to increase the stiffness of the flaps and/or to reduce the potential for deflection of the flaps relative to the aircraft wings when the flaps are stowed.

SUMMARY

Aircraft wing flaps having aerodynamic restoration doors are disclosed herein. In some examples, an apparatus is disclosed. In some disclosed examples, the apparatus comprises a door to be rotatably coupled to a closure rib of a flap of an aircraft wing. In some disclosed examples, the door is to be moveable between a deployed position and a retracted position. In some disclosed examples, the flap has a leading edge and a cutout formed in the leading edge. In some disclosed examples, the door is to fill a portion of the cutout when the door is in the deployed position.

In some examples, a flap of an aircraft wing is disclosed. In some disclosed examples, the flap comprises a leading edge having a cutout. In some disclosed examples, the flap further comprises a closure rib. In some disclosed examples, the flap further comprises a door rotatably coupled to the closure rib and moveable between a deployed position and a retracted position. In some disclosed examples, the door is to fill a portion of the cutout when the door is in the deployed position.

In some examples, a method is disclosed. In some disclosed examples, the method comprises moving a door rotatably coupled to a closure rib of a flap of an aircraft wing from a retracted position to a deployed position to fill a portion of a cutout formed in a leading edge of the flap.

Certain examples are shown in the above-identified figures and described in detail below. In describing these examples, like or identical reference numbers are used to identify the same or similar elements. The figures are not necessarily to scale, and certain features and certain views of the figures may be shown exaggerated in scale or in schematic for clarity and/or conciseness.

DETAILED DESCRIPTION

Aircraft wings (e.g., the wings of a commercial aircraft) commonly include flaps (e.g., outboard flaps and/or inboard flaps) that are movable relative to the aircraft wings between stowed and deployed positions. Such aircraft wings may also include deflection control ribs to increase the stiffness of the flaps and/or to reduce the potential for deflection of the flaps relative to the aircraft wings when the flaps are stowed. Such aircraft wings may also include cutouts (e.g., skin voids) formed in the leading edges of the flaps to provide clearance for the deflection control rib as the flaps are moved between the stowed and deployed positions. The existence of the cutouts decreases the aerodynamic performance of the aircraft wing (e.g., by increasing drag) when the flaps are deployed at low flight speeds and positioned at high detents (e.g., flaps thirty (F30), flaps forty (F40), etc.).

The aircraft wing flaps disclosed herein advantageously include aerodynamic restoration doors that are movable between a deployed position (e.g., an aerodynamic restoration position) and a retracted position. As used herein, the term "door" refers individually and/or collectively to a door frame and/or a door skin of an aerodynamic restoration door assembly. For example, the door 802 of the aerodynamic restoration door assembly 800 of FIG. 8 may include the door frame 804 and/or the door skin 806 of FIG. 8, as further described below. When the disclosed aerodynamic restoration doors are moved and/or rotated into the deployed position, the aerodynamic restoration doors advantageously fill and/or aerodynamically restore portions (e.g., major portions and/or substantially all) of the cutouts. The filling and/or aerodynamic restoration of the cutouts via the disclosed aerodynamic restoration doors advantageously increases the aerodynamic performance (e.g., decreases drag) associated with the aircraft wing when the disclosed aircraft wing flaps are deployed at low flight speeds and positioned at high detents (e.g., flaps thirty (F30), flaps forty (F40), etc.).

Figure 1:
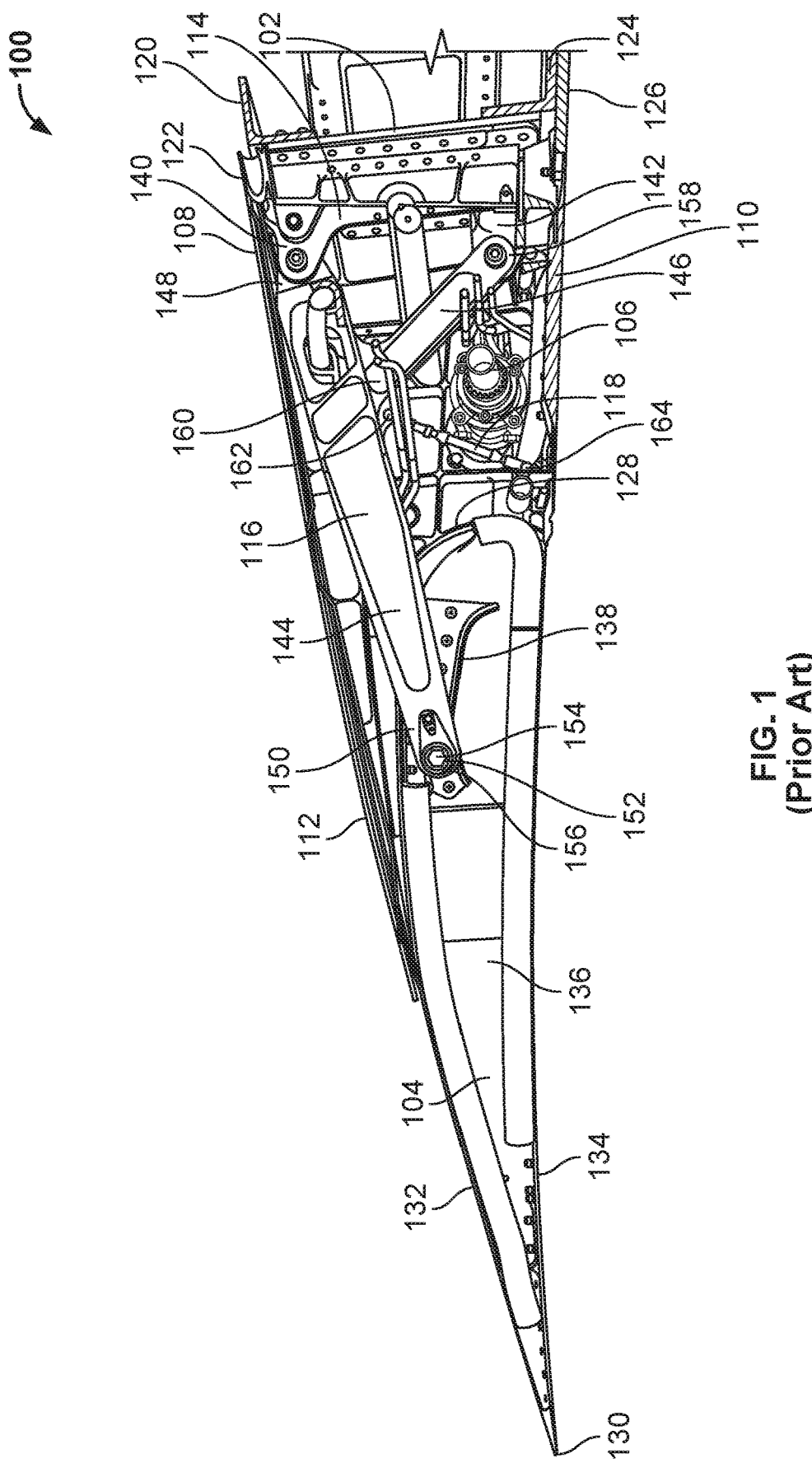
FIG. 1 is a cross-sectional view a known aircraft wing.
Figure 2:
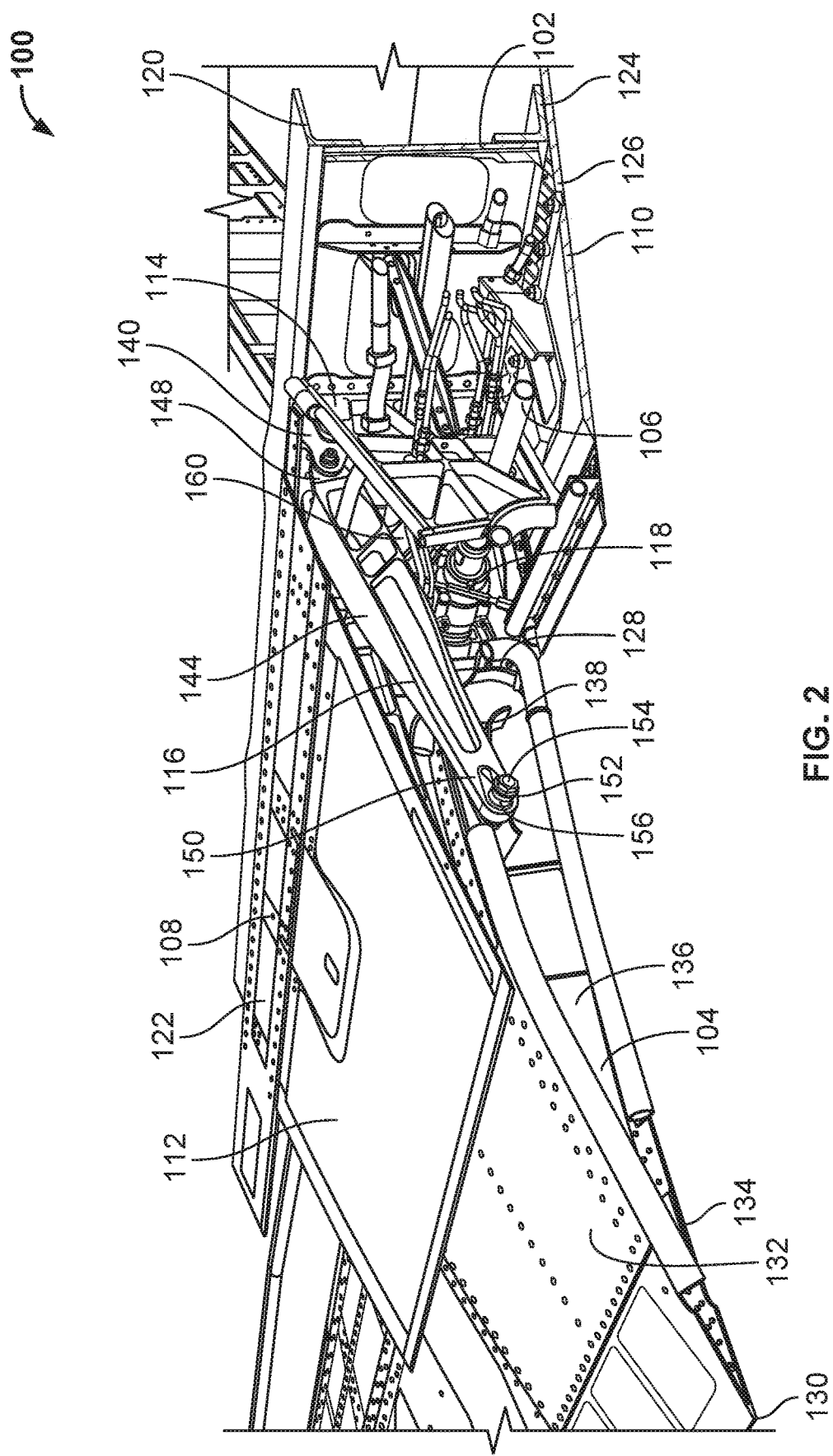
FIG. 2 is a first partial cutaway perspective view of the known aircraft wing of FIG. 1.
Figure 3:
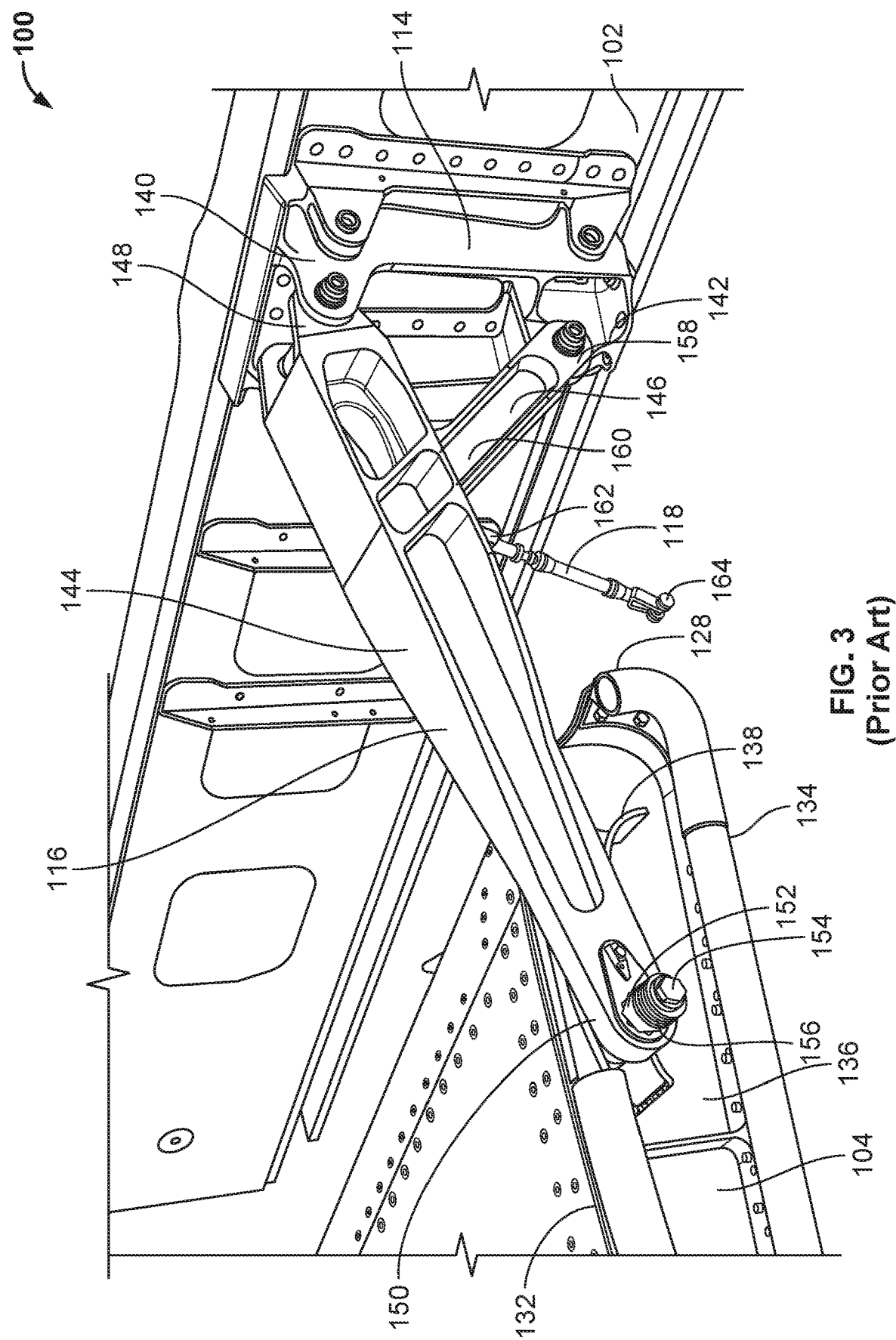
FIG. 3 is a second partial cutaway perspective view of the known aircraft wing of FIGS. 1 and 2.
Figure 4:
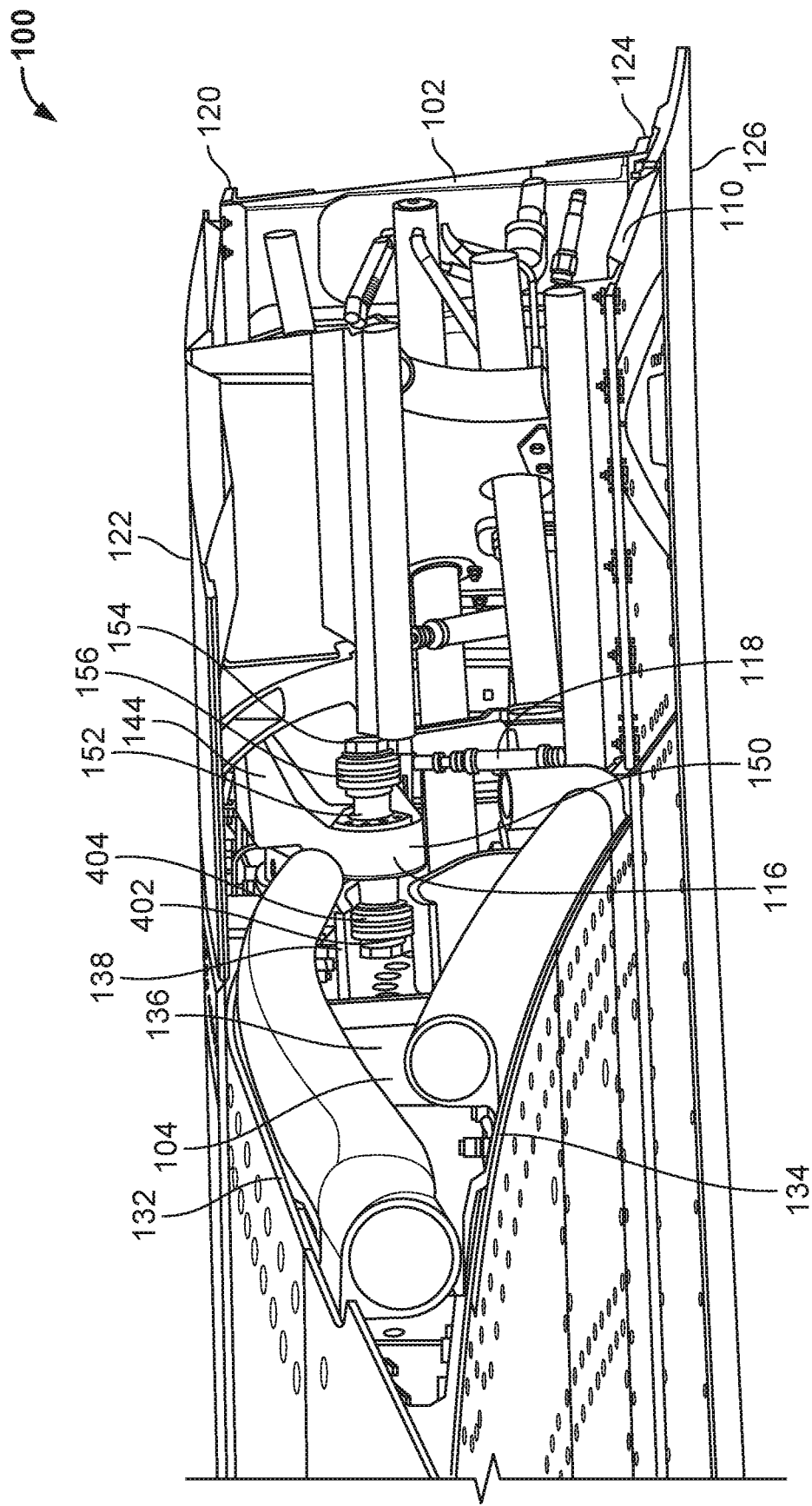
FIG. 4 is a third partial cutaway perspective view of the known aircraft wing of FIGS. 1-3.
Figure 5:
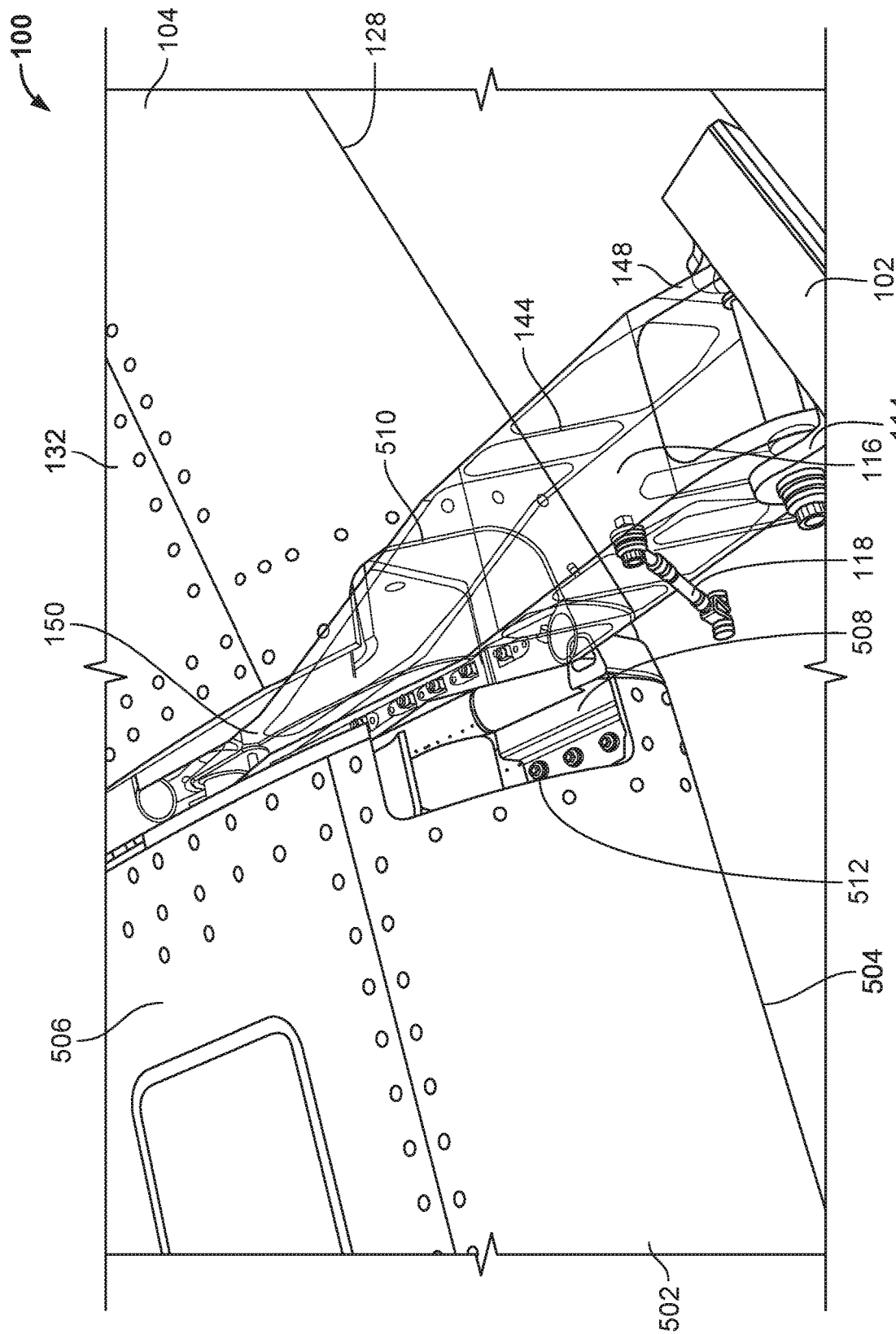
FIG. 5 is a fourth partial cutaway perspective view of the known aircraft wing of FIGS. 1-4.
Figure 6:
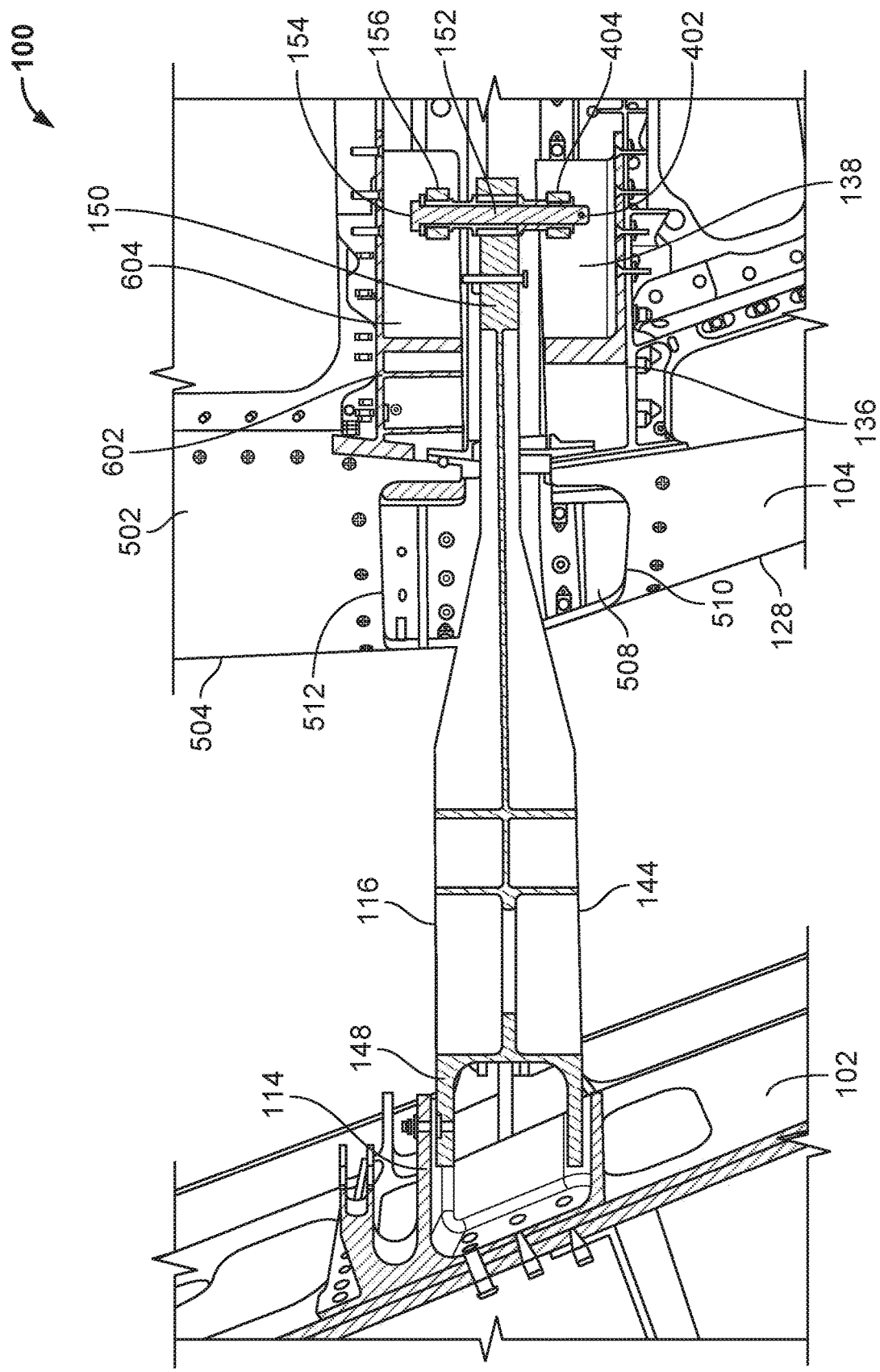
FIG. 6 is a partial cutaway plan view of the known aircraft wing of FIGS. 1-5.

Before describing the details of the disclosed aircraft wing flaps having aerodynamic restoration doors, a description of a known aircraft wing having known flaps is provided in connection with FIGS. 1-6. FIG. 1 is a cross-sectional view of a known aircraft wing 100. FIG. 2 is a first partial cutaway perspective view of the known aircraft wing 100 of FIG. 1. FIG. 3 is a second partial cutaway perspective view of the known aircraft wing 100 of FIGS. 1 and 2. FIG. 4 is a third partial cutaway perspective view of the known aircraft wing 100 of FIGS. 1-3. FIG. 5 is a fourth partial cutaway perspective view of the known aircraft wing 100 of FIGS. 1-4. FIG. 6 is a partial cutaway plan view of the known aircraft wing 100 of FIGS. 1-5.

The aircraft wing 100 of FIGS. 1-6 includes a rear spar 102, an outboard flap 104, a flap drive 106, an upper fixed trailing edge panel 108, a lower fixed trailing edge panel 110, a spoiler 112, a rear spar fitting 114, a deflection control rib 116, and a tie rod 118. The rear spar 102 of FIGS. 1-6 extends in a spanwise direction along a portion of the aircraft wing 100. The rear spar 102 includes an upper chord 120 located proximate an upper surface 122 of the aircraft wing 100, and a lower chord 124 located opposite the upper chord 120 proximate a lower surface 126 of the aircraft wing 100.

The outboard flap 104 of FIGS. 1-6 extends along a portion of the rear spar 102 of FIGS. 1-6 and is movably coupled thereto via a deployment mechanism (not shown) driven and/or controlled via the flap drive 106 of FIGS. 1-6. Actuation of the flap drive 106 causes the outboard flap 104 to move relative to the rear spar 102 between the stowed position shown in FIGS. 1-6 and a deployed position in which the outboard flap 104 is spaced further away from the rear spar 102 relative to the spacing associated with the stowed position shown in FIGS. 1-6. The outboard flap 104 of FIGS. 1-6 includes a leading edge 128, a trailing edge 130 located aft and/or rearward of the leading edge 128, an upper surface 132 extending between the leading edge 128 and the trailing edge 130, a lower surface 134 located opposite the upper surface 132 and also extending between the leading edge 128 and the trailing edge 130, a closure rib 136 extending between the leading edge 128, the trailing edge 130, the upper surface 132 and the lower surface 134, and a track 138 coupled to and/or mounted on the closure rib 136.

As shown in FIGS. 5 and 6, the aircraft wing 100 of FIGS. 1-6 further includes an inboard flap 502 located laterally adjacent the outboard flap 104 of FIGS. 1-6 along the spanwise direction of the rear spar 102 and/or the aircraft wing 100 of FIGS. 1-6. Like the outboard flap 104, the inboard flap 502 of FIGS. 5 and 6 extends along a portion of the rear spar 102 of FIGS. 1-6 and is movably coupled thereto via a deployment mechanism (not shown) driven and/or controlled via the flap drive 106 of FIGS. 1-6. Actuation of the flap drive 106 causes the inboard flap 502 to move relative to the rear spar 102 between the stowed position shown in FIGS. 5 and 6 and a deployed position in which the inboard flap 502 is spaced further away from the rear spar 102 relative to the spacing associated with the stowed position shown in FIGS. 5 and 6. The inboard flap 502 of FIGS. 5 and 6 includes a leading edge 504, a trailing edge (not visible in FIGS. 5 and 6) located aft and/or rearward of the leading edge 504, an upper surface 506 extending between the leading edge 504 and the trailing edge, a lower surface (not visible in FIGS. 5 and 6) located opposite the upper surface 506 and also extending between the leading edge 504 and the trailing edge, a closure rib 602 extending between the leading edge 504, the trailing edge, the upper surface 506 and the lower surface, and a track 604 coupled to and/or mounted on the closure rib 602. The closure rib 602 and track 604 of the inboard flap 502 face the closure rib 136 and the track 138 of the outboard flap 104.

The upper fixed trailing edge panel 108 of FIGS. 1-6 is coupled and/or mounted to the upper chord 120 of the rear spar 102 of FIGS. 1-6 and extends in an aft and/or rearward direction therefrom. The lower fixed trailing edge panel 110 of FIGS. 1-6 is coupled and/or mounted to the lower chord 124 of the rear spar 102 of FIGS. 1-6 and extends in an aft and/or rearward direction therefrom. When the outboard flap 104 of FIGS. 1-6 is in the stowed position shown in FIGS. 1-6, the spoiler 112 of FIGS. 1-6 extends between the upper fixed trailing edge panel 108 and the upper surface 132 of the outboard flap 104. As shown in FIGS. 1 and 2, the upper surface 122 of the aircraft wing 100 is formed by the upper fixed trailing edge panel 108, the spoiler 112, and the upper surface 132 of the outboard flap 104 when the outboard flap 104 is stowed. As further shown in FIGS. 1 and 2, the lower surface 126 of the aircraft wing 100 is formed by the lower fixed trailing edge panel 110 and the lower surface 134 of the outboard flap 104 when the outboard flap 104 is stowed.

The rear spar fitting 114 of FIGS. 1-6 is coupled and/or mounted to the rear spar 102 of FIGS. 1-6 at a location and/or position that is generally between the respective lateral locations and/or lateral positions of the outboard flap 104 of FIGS. 1-6 and the inboard flap 502 of FIGS. 5-9 along the spanwise direction of the rear spar 102. The rear spar fitting 114 includes a first end 140 located and/or positioned proximate the upper chord 120 of the rear spar 102 and/or proximate the upper fixed trailing edge panel 108, and a second end 142 located and/or positioned proximate the lower chord 124 of the rear spar 102 and/or proximate the lower fixed trailing edge panel 110. The rear spar fitting 114 is accordingly located and/or positioned between the upper fixed trailing edge panel 108 and the lower fixed trailing edge panel 110.

The deflection control rib 116 of FIGS. 1-6 is coupled and/or mounted to the rear spar fitting 114 of FIGS. 1-6 and extends in an aft and/or rearward direction therefrom such that the deflection control rib 116 is located and/or positioned between the closure rib 136 of the outboard flap 104 of FIGS. 1-6 and the closure rib 602 of the inboard flap 502 of FIGS. 5 and 6. The deflection control rib 116 of FIGS. 1-6 increases the stiffness of the outboard flap 104 of FIGS. 1-6 and/or the inboard flap 502 of FIGS. 5 and 6 to reduce the potential for deflection of the outboard flap 104 and/or the inboard flap 502 relative to the rear spar 102 of the aircraft wing 100 when the outboard flap 104 and the inboard flap 502 are stowed.

The deflection control rib 116 of FIGS. 1-6 includes a primary arm 144 and a secondary arm 146. The primary arm 144 of the deflection control rib 116 includes a first end 148 and a second end 150 located opposite the first end 148. The first end 148 of the primary arm 144 is coupled to the first end 140 of the rear spar fitting 114. A roller arm 152 is coupled to the second end 150 of the primary arm 144 and extends transversely therethrough. The roller arm 152 includes a first end 402 (not visible in FIGS. 1-3) having a first roller 404 (not visible in FIGS. 1-3) coupled and/or mounted thereto, and a second end 154 located opposite the first end 402 and having a second roller 156 coupled and/or mounted thereto. When the outboard flap 104 of FIGS. 1-6 and the inboard flap 502 of FIGS. 5-9 are stowed as shown in FIGS. 1-6, the first roller 404 of the roller arm 152 engages and/or is positioned within the track 138 of the outboard flap 104, and the second roller 156 of the roller arm 152 engages and/or is positioned within the track 604 of the inboard flap 502.

The secondary arm 146 of the deflection control rib 116 of FIGS. 1-6 includes a first end 158 and a second end 160 located opposite the first end 158. The first end 158 of the secondary arm 146 is coupled to the second end 142 of the rear spar fitting 114. The second end 160 of the secondary arm 146 is integrally formed with the primary arm 144 of the deflection control rib 116.

As shown in FIGS. 5 and 6, a gap 508 exists between the leading edge 128 of the outboard flap 104 and the leading edge 504 of the inboard flap 502. The gap 508 is formed in part by a first cutout or skin void 510 in the leading edge 128 of the outboard flap 104 and a second cutout or skin void 512 in the leading edge 504 of the inboard flap 502. The first cutout or skin void 510 and the second cutout or skin void 512 of FIGS. 5 and 6 are respectively shaped to enable the outboard flap 104 and the inboard flap 502 to be fully deployed without interference from the roller arm 152, the first roller 404, and/or the second roller 156 of the deflection control rib 116 of FIGS. 1-6. In other words, the size of the roller arm 152 of the deflection control rib 116 of FIGS. 1-6 and the structures supported on the roller arm 152 (e.g., the first roller 404 and the second roller 156) necessitates the first cutout or skin void 510 of the outboard flap 104 and the second cutout or skin void 512 of the inboard flap 502 of FIGS. 1-6.

The tie rod 118 of the aircraft wing 100 of FIGS. 1-6 extends from the deflection control rib 116 of FIGS. 1-6 and provides support for the lower fixed trailing edge panel 110 of FIGS. 1-6. The tie rod 118 includes a first end 162 and a second end 164 located opposite the first end 162. The first end 162 of the tie rod 118 is coupled to the deflection control rib 116 proximate the junction between the primary arm 144 and the secondary arm 146 of the deflection control rib 116. The second end 164 of the tie rod 118 is coupled to the lower fixed trailing edge panel 110.

Figure 7:
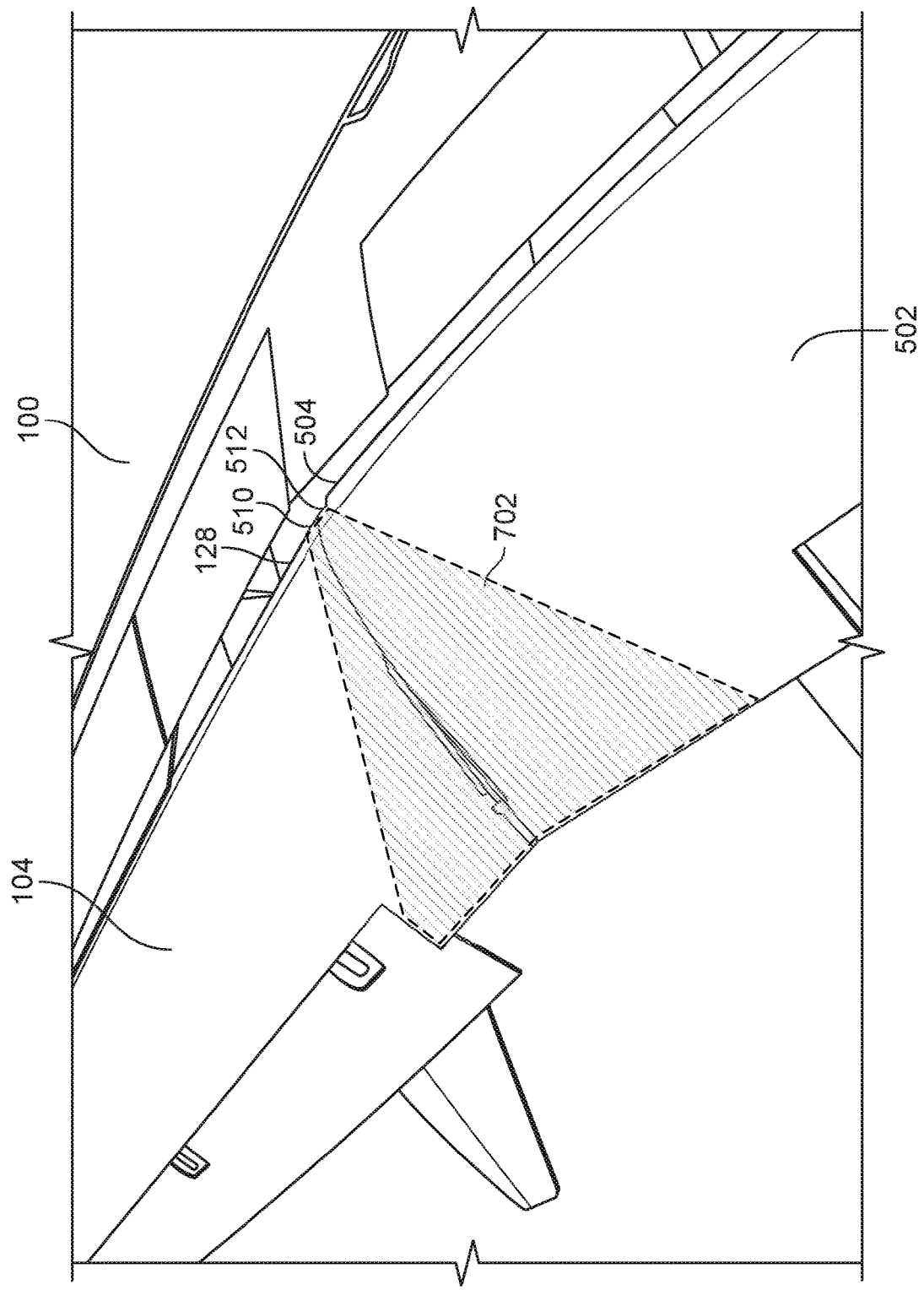
FIG. 7 is a perspective view of the known aircraft wing of FIGS. 1-6 illustrating the outboard flap and the inboard flap of the known aircraft wing deployed and positioned at a flaps forty (F40) detent.

The existence of the first cutout or skin void 510 in the leading edge 128 of the outboard flap 104 and the second cutout or skin void 512 in the leading edge 504 of the inboard flap 502 of FIGS. 1-6 decreases the aerodynamic performance of the aircraft wing 100 (e.g., by increasing drag) when the outboard flap 104 and/or the inboard flap 502 is/are deployed at low flight speeds and positioned at high detents (e.g., flaps thirty (F30), flaps forty (F40), etc.). For example, FIG. 7 is a perspective view of the known aircraft wing 100 of FIGS. 1-6 illustrating the outboard flap 104 and the inboard flap 502 of the known aircraft wing 100 deployed and/or positioned at a flaps forty (F40) detent. Positioning the outboard flap 104 and the inboard flap 502 of the aircraft wing 100 of FIGS. 1-7 at the flaps forty (F40) detent (e.g., as shown in FIG. 7) at low flight speeds decreases the aerodynamic performance of the aircraft wing 100 over and/or along the reduced performance area 702 of the aircraft wing 100.

The aircraft wing flaps disclosed herein have aerodynamic restoration doors that are movable between a deployed position (e.g., an aerodynamic restoration position) and a retracted position. In some examples, the disclosed aerodynamic restoration doors may be moved and/or rotated into the deployed position in response to the disclosed aircraft wing flaps being deployed (e.g., deployed at a high detent position such as flaps thirty (F30), flaps forty (F40), etc.) relative to an aircraft wing. In some examples, the disclosed aerodynamic restoration doors may be moved and/or rotated into the retracted position in response to the disclosed aircraft wing flaps being stowed relative to the aircraft wing. When the disclosed aerodynamic restoration doors are moved and/or rotated into the deployed position, the aerodynamic restoration doors advantageously fill and/or aerodynamically restore portions (e.g., major portions and/or substantially all) of the cutouts or skin voids respectively formed in the leading edges of the disclosed aircraft wing flaps. The filling and/or aerodynamic restoration of the cutouts or skin voids via the disclosed aerodynamic restoration doors advantageously increases the aerodynamic performance (e.g., decreases drag) associated with the aircraft wing when the disclosed aircraft wing flaps are deployed at low flight speeds and positioned at high detents (e.g., flaps thirty (F30), flaps forty (F40), etc.). These and other advantages attributable to aerodynamic restoration doors disclosed herein will be further appreciated based on the description that follows.

Figure 8:
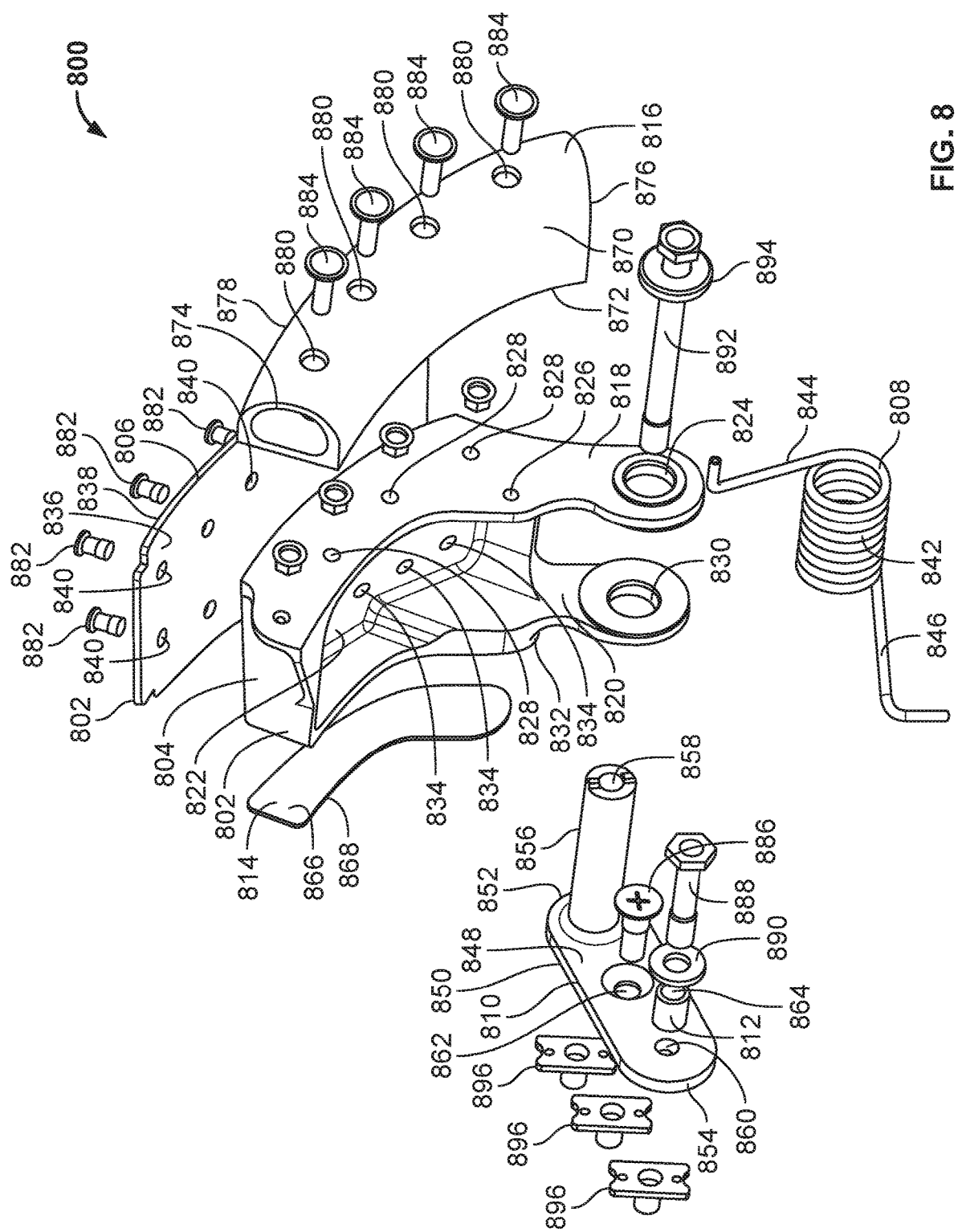
FIG. 8 is an exploded view of an example aerodynamic restoration door assembly constructed in accordance with the teachings of this disclosure.

FIG. 8 is an exploded view of an example aerodynamic restoration door assembly 800 constructed in accordance with the teachings of this disclosure. The aerodynamic restoration door assembly 800 of FIG. 8 may be coupled, fastened, and/or mounted to a closure rib of a flap of an aircraft wing (e.g., the closure rib 136 of the outboard flap 104 of the aircraft wing 100 of FIGS. 1-7). In some examples, the aerodynamic restoration door assembly 800 of FIG. 8 fills and/or aerodynamically restores a portion (e.g., a major portion and/or substantially all) of a cutout or skin void formed in a leading edge of the flap (e.g., the first cutout or skin void 510 formed in the leading edge 128 of the outboard flap 104 of FIGS. 1-7) when a door of the aerodynamic restoration door assembly 800 is moved into a deployed position (e.g., an aerodynamic restoration position) relative to the leading edge of the flap.

Figure 13:
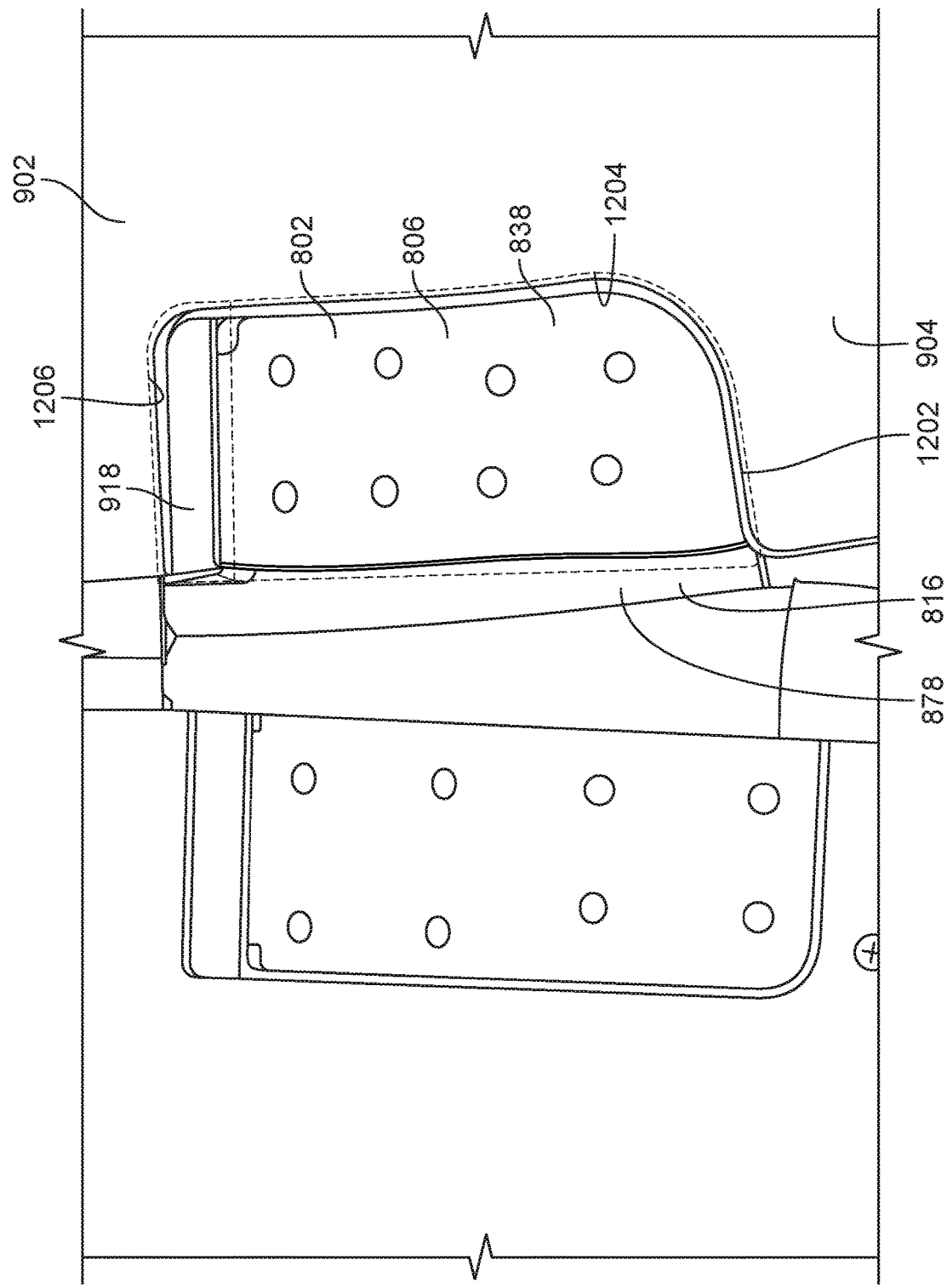
FIG. 13 is a second perspective view of the example outboard flap of FIGS. 9-12 including the example aerodynamic restoration door assembly of FIGS. 8-12 in the example deployed position of FIGS. 9-12.
Figure 15:
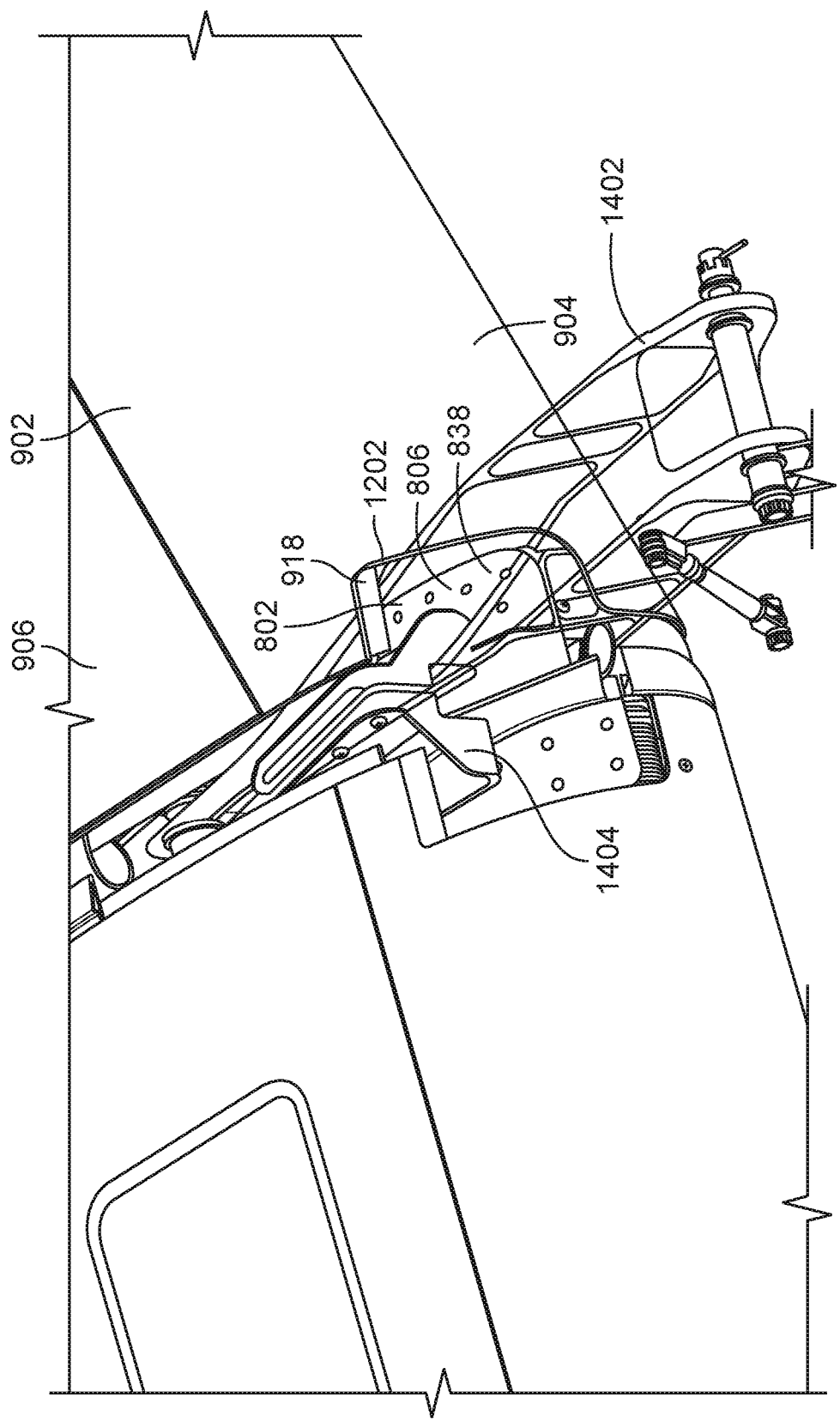
FIG. 15 is a partial cutaway perspective view of the example outboard flap of FIGS. 9-14 including the example aerodynamic restoration door assembly of FIGS. 8-14 in the example retracted position of FIG. 14.
Figure 16:
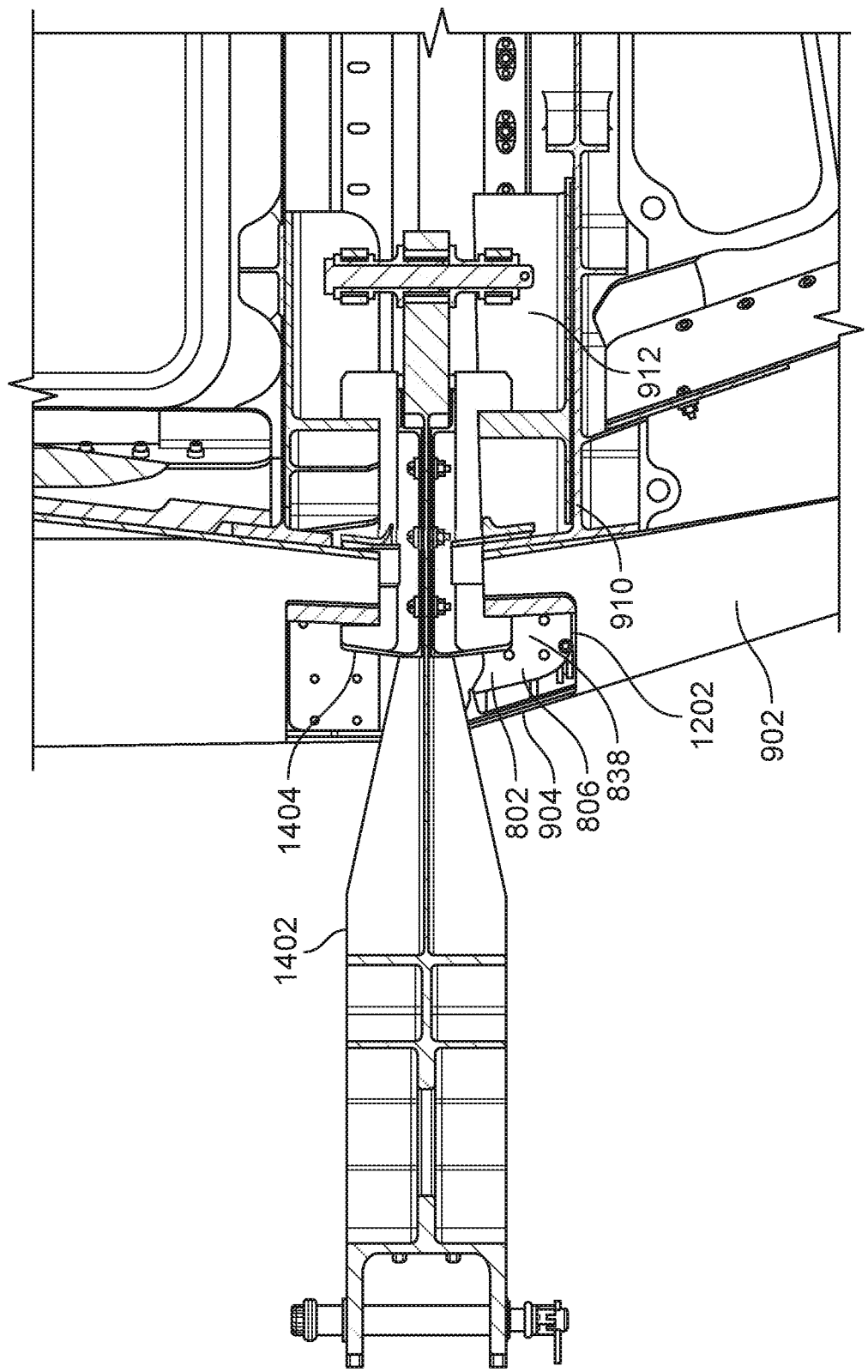
FIG. 16 is partial cutaway plan view of the example outboard flap of FIGS. 9-15 including the example aerodynamic restoration door assembly of FIGS. 8-15 in the example retracted position of FIGS. 14 and 15.

In some examples (e.g., as shown in FIGS. 13, 15 and 16), a first aerodynamic restoration door assembly 800 as shown and described in connection with FIG. 8 may be coupled, fastened, and/or mounted to a first flap (e.g., an outboard flap) of an aircraft wing, and a second aerodynamic restoration door assembly constructed in an orientation opposite that shown and described in connection with FIG. 8 may be coupled, fastened, and or mounted to a second flap (e.g., an inboard flap adjacent the outboard flap) of the aircraft wing. In such examples, the first and second aerodynamic restoration door assemblies may aerodynamically restore respective portions of a first cutout or skin void formed in a leading edge of the first flap and a second cutout or skin void formed in a leading edge of the second flap when the respective doors of the first and second aerodynamic restoration door assemblies are moved into respective deployed positions (e.g., aerodynamic restoration positions) relative to the respective leading edges of the first and second flaps.

In the illustrated example of FIG. 8, the aerodynamic restoration door assembly 800 includes an example door 802 including an example door frame 804 and an example door skin 806, an example torsion spring 808, an example spindle fitting 810, an example spring tensioner 812, an example rub pad 814, and an example bulb seal 816. Respective ones of the door 802, the door frame 804, the door skin 806, the torsion spring 808, the spindle fitting 810, the spring tensioner 812, the rub pad 814, and or the bulb seal 816 of FIG. 8 may be of any size(s), shape(s), orientation(s), and/or configuration(s), including the respective size(s), shape(s), orientation(s), and/or configuration(s) shown in FIG. 8 and described herein.

The door frame 804 of FIG. 8 includes a first example arm 818, a second example arm 820, and an example support web 822. In the illustrated example of FIG. 8, the first arm 818 of the door frame 804 is spaced apart from the second arm 820 of the door frame 804 by a distance that is sufficiently large for the torsion spring 808 of FIG. 8 to be operatively positioned between the first arm 818 of the door frame 804 and the second arm 820 of the door frame 804. The support web 822 of the door frame 804 of FIG. 8 extends between the first arm 818 of the door frame 804 and the second arm 820 of the door frame 804.

The first arm 818 of the door frame 804 of FIG. 8 includes an example door frame fastener through hole 824, an example spring arm through hole 826, and example bulb seal fastener through holes 828. In the illustrated example of FIG. 8, the door frame fastener through hole 824 of the first arm 818 is to receive a fastener (e.g., the door frame fastener 892 of FIG. 8 described below) to facilitate rotatably coupling, fastening, and/or mounting the door frame 804 of FIG. 8 to the spindle fitting 810 of FIG. 8, and/or to a closure rib of a flap. The spring arm through hole 826 of the first arm 818 is to receive an arm of the torsion spring 808 of FIG. 8 (e.g., the first arm 844 of the torsion spring 808 of FIG. 8 described below) to couple the arm of the torsion spring 808 to the door frame 804 of FIG. 8. Respective ones of the bulb seal fastener through holes 828 of the first arm 818 are to receive corresponding respective fasteners (e.g., the bulb seal fasteners 884 of FIG. 8 described below) to facilitate coupling, fastening, and/or mounting the bulb seal 816 of FIG. 8 to the door frame 804 of FIG. 8.

The second arm 820 of the door frame 804 of FIG. 8 includes an example door frame fastener through hole 830 aligned (e.g., concentrically aligned) with the door frame fastener through hole 824 of the first arm 818 of the door frame 804. In the illustrated example of FIG. 8, the door frame fastener through hole 830 of the second arm 820 is to receive a fastener (e.g., the door frame fastener 892 of FIG. 8 described below) to facilitate rotatably coupling, fastening, and/or mounting the door frame 804 of FIG. 8 to the spindle fitting 810 of FIG. 8, and/or to a closure rib of a flap. The second arm 820 of the door frame 804 of FIG. 8 also includes an example stop 832 (e.g., a mechanical stop). The stop 832 of FIG. 8 is to prevent the door frame 804 of FIG. 8 from moving and/or rotating past the spindle fitting 810 of FIG. 8 as the door frame 804 and/or, more generally, the door 802 of FIG. 8 is moved and/or rotated away from a deployed position, as further described below. In the illustrated example of FIG. 8, the stop 832 of FIG. 8 is integrally formed with the second arm 820 of the door frame 804 of FIG. 8 such that the stop 832 is not separable from the second arm 820 of the door frame 804 absent destructive means. In other examples, the stop 832 of FIG. 8 may be formed separately from the second arm 820 of the door frame 804 of FIG. 8, and may be coupled, fastened, and/or mounted to the second arm 820 of the door frame 804 via one or more fastener(s).

The support web 822 of the door frame 804 of FIG. 8 is to support the door skin 806 of FIG. 8. In some examples, the support web 822 may be formed by a sheet of material.

In other examples, the support web 822 may be formed by one or more material member(s) that span and/or extend between the first arm 818 of the door frame 804 of FIG. 8 and the second arm 820 of the door frame 804 of FIG. 8. The support web 822 of the door frame 804 of FIG. 8 includes example door skin fastener through holes 834. In the illustrated example of FIG. 8, respective ones of the door skin fastener through holes 834 of the support web 822 are to receive corresponding respective fasteners (e.g., the door skin fasteners 882 of FIG. 8 described below) to facilitate coupling, fastening, and/or mounting the door skin 806 of FIG. 8 to the door frame 804 of FIG. 8.

The door skin 806 of FIG. 8 is shaped and/or contoured to fill and/or aerodynamically restore a portion (e.g., a major portion and/or substantially all) of a cutout or skin void formed in a leading edge of a flap (e.g., the first cutout or skin void 510 formed in the leading edge 128 of the outboard flap 104 of FIGS. 1-7) when the door frame 804, the door skin 806, and/or, more generally, the door 802 of FIG. 8 is/are moved into a deployed position (e.g., an aerodynamic restoration position) relative to the leading edge of the flap. In the illustrated example of FIG. 8, the door skin 806 is formed separately from the door frame 804 of FIG. 8. For example, the door skin 806 may be formed from corrosion resistant steel, and the door frame 804 may be formed from aluminum. In other examples, the door skin 806 of FIG. 8 may be integrally formed with the door frame 804 of FIG. 8 such that the door skin 806 is not separable from the door frame 804 absent destructive means.

The door skin 806 of FIG. 8 includes an example inner surface 836 and an example outer surface 838 located opposite the inner surface 836. In the illustrated example of FIG. 8, the inner surface 836 of the door skin 806 faces toward the support web 822 of the door frame 804, and the outer surface 838 of the door skin 806 faces away from the support web 822 of the door frame 804. The outer surface 838 of the door skin 806 of FIG. 8 has an aerodynamic and/or contoured profile that generally follows, tracks, and/or aligns with an aerodynamic and/or contoured profile of a leading edge of a flap when the door frame 804 and/or the door skin 806 of FIG. 8 is/are moved into a deployed position (e.g., an aerodynamic restoration position) relative to the leading edge of the flap.

The door skin 806 of FIG. 8 also includes example door skin fastener through holes 840 to be aligned (e.g., concentrically aligned) with respective ones of the door skin fastener through holes 834 of the support web 822 of the door frame 804 of FIG. 8. In the illustrated example of FIG. 8, respective ones of the door skin fastener through holes 840 of the door skin 806 are to receive corresponding respective fasteners (e.g., the door skin fasteners 882 of FIG. 8 described below) to facilitate coupling, fastening, and/or mounting the door skin 806 of FIG. 8 to the door frame 804 of FIG. 8.

The torsion spring 808 of FIG. 8 is to bias the door frame 804 and/or the door skin 806 of FIG. 8 into a deployed position (e.g., an aerodynamic restoration position) relative to a leading edge of a flap. The torsion spring 808 of FIG. 8 includes an example coiled portion 842, a first example arm 844, and a second example arm 846. In the illustrated example of FIG. 8, the coiled portion 842 of the torsion spring 808 is to be positioned between the first arm 818 of the door frame 804 of FIG. 8 and the second arm 820 of the door frame 804 of FIG. 8. For example, the coiled portion 842 of the torsion spring 808 may be positioned between the first arm 818 of the door frame 804 and the second arm 820 of the door frame 804 such that the coiled portion 842 of the torsion spring 808 is aligned (e.g., concentrically aligned) with the door frame fastener through hole 824 of the first arm 818 of the door frame 804 and the door frame fastener through hole 830 of the second arm 820 of the door frame 804. The coiled portion 842 of the torsion spring 808 of FIG. 8 is to receive a fastener (e.g., the door frame fastener 892 of FIG. 8 described below) and/or a spindle (e.g., the spindle 856 of the spindle fitting 810 of FIG. 8 described below) to facilitate coupling, fastening, and/or mounting the torsion spring 808 of FIG. 8 to the door frame 804 of FIG. 8, to the spindle fitting 810 of FIG. 8, and/or to a closure rib of a flap.

In the illustrated example of FIG. 8, the first arm 844 and the second arm 846 of the torsion spring 808 respectively extend from the coiled portion 842 of the torsion spring 808. The first arm 844 of the torsion spring 808 of FIG. 8 is to extend through the spring arm through hole 826 of the first arm 818 of the door frame 804 of FIG. 8 to couple the first arm 844 of the torsion spring 808 to the door frame 804. The second arm 846 of the torsion spring 808 of FIG. 8 is to contact and/or to be positioned on the spring tensioner 812 of FIG. 8 to produce a tension force in the coiled portion 842 of the torsion spring 808. The tension force produced in the coiled portion 842 of the torsion spring 808 of FIG. 8 in response to the second arm 846 of the torsion spring 808 of FIG. 8 contacting the spring tensioner 812 of FIG. 8 biases the door frame 804 of FIG. 8 away from a retracted position and toward a deployed position (e.g., an aerodynamic restoration position), as further described below.

The spindle fitting 810 of FIG. 8 includes a first example surface 848, a second example surface 850 located opposite the first surface 848, a first example end 852, and a second example end 854 located opposite the first end 852. In the illustrated example of FIG. 8, the first surface 848 of the spindle fitting 810 faces toward the door frame 804 of FIG. 8, and the second surface 850 of the spindle fitting 810 faces away from the door frame 804 of FIG. 8. The spindle fitting 810 of FIG. 8 also includes an example spindle 856. In the illustrated example of FIG. 8, the spindle 856 of FIG. 8 is integrally formed with the spindle fitting 810 of FIG. 8 such that the spindle 856 is not separable from the spindle fitting 810 absent destructive means. In other examples, the spindle 856 of FIG. 8 may be formed separately from the spindle fitting 810 of FIG. 8, and may be coupled, fastened, and/or mounted to the spindle fitting 810 via one or more fastener(s). The spindle 856 of FIG. 8 is integrally formed on the spindle fitting 810 of FIG. 8 proximate the first end 852 of the spindle fitting 810 such that the spindle 856 extends from the first surface 848 of the spindle fitting 810 toward the door frame 804 of FIG. 8. For example, the spindle 856 of FIG. 8 may extend from the first surface 848 of the spindle fitting 810 of FIG. 8 such that the spindle 856 extends through the door frame fastener through hole 826 of the first arm 818 of the door frame 804 of FIG. 8, and through the door frame fastener through hole 830 of the second arm 820 of the door frame 804 of FIG. 8.

The spindle fitting 810 of FIG. 8 also includes an example door frame fastener through hole 858 located proximate the first end 852 of the spindle fitting 810, an example spring tensioner fastener through hole 860 located proximate the second end 854 of the spindle fitting 810, and an example spindle fitting fastener through hole 862 located between the first end 852 of the spindle fitting 810 and the second end 854 of the spindle fitting 810. In the illustrated example of FIG. 8, the door frame fastener through hole 858 of the spindle fitting 810 extends through the spindle 856 of the spindle fitting 810. The door frame fastener through hole 858 of the spindle fitting 810 of FIG. 8 is to be aligned (e.g., concentrically aligned) with the door frame fastener through hole 824 of the first arm 818 of the door frame 804 of FIG. 8, and with the door frame fastener through hole 830 of the second arm 820 of the door frame 804 of FIG. 8.

In the illustrated example of FIG. 8, the door frame fastener through hole 858 of the spindle fitting 810 of FIG. 8 is to receive a fastener (e.g., the door frame fastener 892 of FIG. 8 described below) to facilitate rotatably coupling, fastening, and/or mounting the door frame 804 of FIG. 8 to the spindle fitting 810 of FIG. 8, and/or to a closure rib of a flap. The spring tensioner fastener through hole 860 of the spindle fitting 810 is to receive a fastener (e.g., the spring tensioner fastener 888 of FIG. 8 described below) to facilitate coupling, fastening, and/or mounting the spring tensioner 812 of FIG. 8 to the spindle fitting 810 of FIG. 8, and/or to a closure rib of a flap. The spindle fitting fastener through hole 862 of the spindle fitting 810 is to receive a fastener (e.g., the spindle fitting fastener 886 of FIG. 8 described below) to facilitate coupling, fastening, and/or mounting the spindle fitting 810 of FIG. 8 to a closure rib of a flap.

The spring tensioner 812 of FIG. 8 is to support the second arm 846 of the torsion spring 808 of FIG. 8 to cause the second arm 846 of the torsion spring 808 to produce a tension force in the coiled portion 842 of the torsion spring 808. In the illustrated example of FIG. 8, the spring tensioner 812 is formed separately from the spindle fitting 810 of FIG. 8. In other examples, the spring tensioner 812 of FIG. 8 may be integrally formed with the spindle fitting 810 of FIG. 8 such that the spring tensioner 812 is not separable from the spindle fitting 810 absent destructive means. The spring tensioner 812 of FIG. 8 includes an example spring tensioner fastener through hole 864 to be aligned (e.g., concentrically aligned) with the spring tensioner fastener through hole 860 of the spindle fitting 810 of FIG. 8. In the illustrated example of FIG. 8, the spring tensioner fastener through hole 864 of the spring tensioner 812 is to receive a fastener (e.g., the spring tensioner fastener 888 of FIG. 8 described below) to facilitate coupling, fastening, and/or mounting the spring tensioner 812 of FIG. 8 to the spindle fitting 810 of FIG. 8, and/or to a closure rib of a flap.

The rub pad 814 of FIG. 8 is to provide a buffer and/or barrier between the door frame 804 of FIG. 8 and a closure rib of a flap to which the aerodynamic restoration door assembly 800 of FIG. 8 is coupled. The rub pad 814 of FIG. 8 includes a first example surface 866 and a second example surface 868 located opposite the first surface 866. In the illustrated example of FIG. 8, the first surface 866 of the rub pad 814 faces toward the door frame 804, and the second surface 868 of the rub pad 814 faces away from the door frame 804. The rub pad 814 of FIG. 8 is to be coupled, fastened, and/or bonded (e.g., via adhesive) to the door frame 804 of FIG. 8 such that the rub pad 814 moves and/or rotates along a closure rib of a flap in conjunction with the door frame 804 of FIG. 8 moving and/or rotating along the closure rib of the flap.

The bulb seal 816 of FIG. 8 is shaped and/or contoured to seal and/or fill a portion of a gap proximate a cutout or skin void formed in a leading edge of a flap (e.g., a gap existing between the outboard flap 104 and the inboard flap 502 proximate the first cutout or skin void 510 and the second cutout or skin void 512 of FIGS. 1-7) when the door frame 804, the door skin 806, and/or the bulb seal 816 of FIG. 8 is/are moved into a deployed position (e.g., an aerodynamic restoration position) relative to the leading edge of the flap. The bulb seal 816 of FIG. 8 includes a first example surface 870, a second example surface 872 located opposite the first surface 870, a first example end 874, a second example end 876 located opposite the first end 874, and an example leading edge 878 extending between the first end 874 and the second end 876 of the bulb seal 816. In the illustrated example of FIG. 8, the first surface 870 of the bulb seal 816 faces away from the door frame 804, and the second surface 872 of the bulb seal 816 faces toward from the door frame 804. The leading edge 878 of the bulb seal 816 of FIG. 8 has an aerodynamic and/or contoured profile that generally follows, tracks, and/or aligns with the aerodynamic and/or contoured profile of the outer surface 838 of the door skin 806 of FIG. 8. The second end 876 of the bulb seal 816 is sculpted and/or shaped such that the second end 876 of the bulb seal 816 has an upward pitch moving toward the leading edge 878 of the bulb seal 816 when the door frame 804, the door skin 806, and/or, more generally, the door 802 of FIG. 8 is in a deployed position, as further described below.

The bulb seal 816 of FIG. 8 also includes example bulb seal fastener through holes 880 to be aligned (e.g., concentrically aligned) with respective ones of the bulb seal fastener through holes 828 of the first arm 818 of the door frame 804 of FIG. 8. In the illustrated example of FIG. 8, respective ones of the bulb seal fastener through holes 880 of the bulb seal 816 are to receive corresponding respective fasteners (e.g., the bulb seal fasteners 884 of FIG. 8 described below) to facilitate coupling, fastening, and/or mounting the bulb seal 816 of FIG. 8 to the door frame 804 of FIG. 8.

The example aerodynamic restoration door assembly 800 of FIG. 8 also includes example door skin fasteners 882, example bulb seal fasteners 884, an example spindle fitting fastener 886, an example spring tensioner fastener 888, a first example retaining washer 890, an example door frame fastener 892, a second example retaining washer 894, and example nut plates 896. Respective ones of the door skin fasteners 882, the bulb seal fasteners 884, the spindle fitting fastener 886, the spring tensioner fastener 888, and/or the door frame fastener 892 of FIG. 8 may be implemented as one or more rivet(s), bolt(s), screw(s), post(s), etc. configured to fasten and/or couple one or more structure(s) of the aerodynamic restoration door assembly 800 of FIG. 8 to one another and/or to a closure rib of a flap of an aircraft wing.

Respective ones of the door skin fasteners 882 of FIG. 8 are to extend through the door skin fastener through holes 840 of the door skin 806 of FIG. 8, and through the door skin fastener through holes 834 of the support web 822 of the door frame 804 of FIG. 8 to couple, fasten, and/or mount the door skin 806 to the door frame 804. Respective ones of the bulb seal fasteners 884 are to extend through the bulb seal fastener through holes 880 of the bulb seal 816 of FIG. 8, and through the bulb seal fastener through holes 828 of the first arm 818 of the door frame 804 of FIG. 8, to couple, fasten, and/or mount the bulb seal 816 to the door frame 804.

The spindle fitting fastener 886 of FIG. 8 is to extend through the spindle fitting fastener through hole 862 of the spindle fitting 810 of FIG. 8, through a closure rib of a flap, and into a first one of the nut plates 896 of FIG. 8 to couple, fasten, and/or mount the spindle fitting 810 to the closure rib of the flap. The spring tensioner fastener 888 of FIG. 8 is to extend through the first retaining washer 890 of FIG. 8, through the spring tensioner fastener through hole 864 of the spring tensioner 812 of FIG. 8, through the spring tensioner fastener through hole 860 of the spindle fitting 810 of FIG. 8, through a closure rib of a flap, and into a second one of the nut plates 896 of FIG. 8 to couple, fasten, and/or mount the spring tensioner 812 to the spindle fitting 810 and/or the closure rib of the flap. The door frame fastener 892 of FIG. 8 is to extend through the second retaining washer 894 of FIG. 8, through the door frame fastener through hole 824 of the first arm 818 of the door frame 804 of FIG. 8, through the coiled portion 842 of the torsion spring 808 of FIG. 8, through the door frame fastener through hole 830 of the second arm 820 of the door frame 804 of FIG. 8, through the door frame fastener through hole 858 of the spindle fitting 810 of FIG. 8, through a closure rib of a flap, and into a third one of the nut plates 896 of FIG. 8 to rotatably couple, fasten, and/or mount the door frame 804 and/or, more generally, the door 802 of FIG. 8 to the spindle fitting 810 and/or the closure rib of the flap.

The aerodynamic restoration door assembly 800 of FIG. 8 may be coupled, fastened, and/or mounted to a closure rib of a flap of an aircraft wing (e.g., proximate a leading edge of the flap). In some examples, the door 802 of the aerodynamic restoration door assembly 800 of FIG. 8 may be rotatably coupled, fastened, and/or mounted to the closure rib of the flap such that the door 802 is moveable relative to a leading edge of the flap between a deployed position (e.g., an aerodynamic restoration position) and a retracted position. In some examples, a cutout or skin void is formed in the leading edge of the flap. In some examples, the door 802 of the aerodynamic restoration door assembly 800 of FIG. 8 fills and/or aerodynamically restores a portion (e.g., a major portion and/or substantially all) of the cutout or skin void when the door 802 is in the deployed position.

Figure 9:
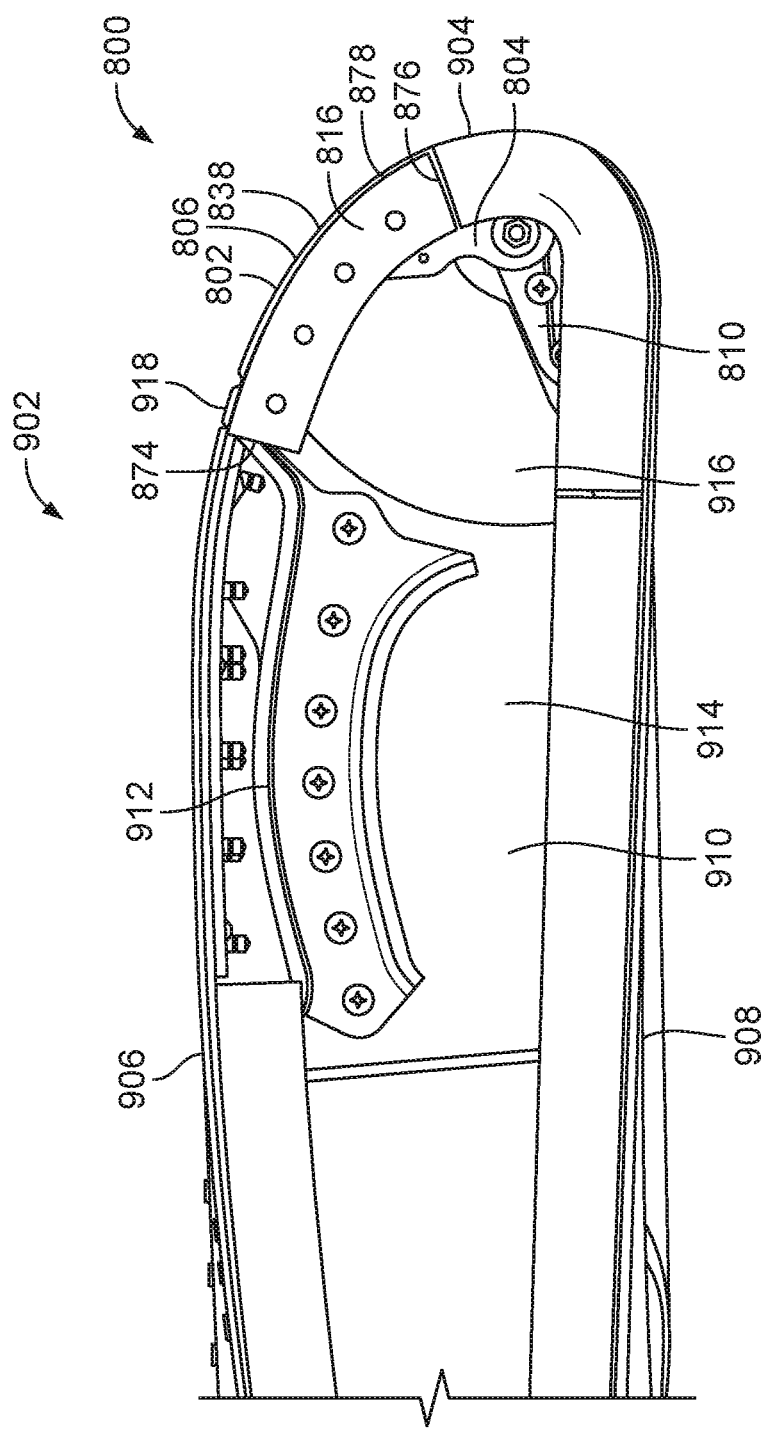
FIG. 9 is a side view of an example outboard flap including the example aerodynamic restoration door assembly of FIG. 8 in an example deployed position.
Figure 10:
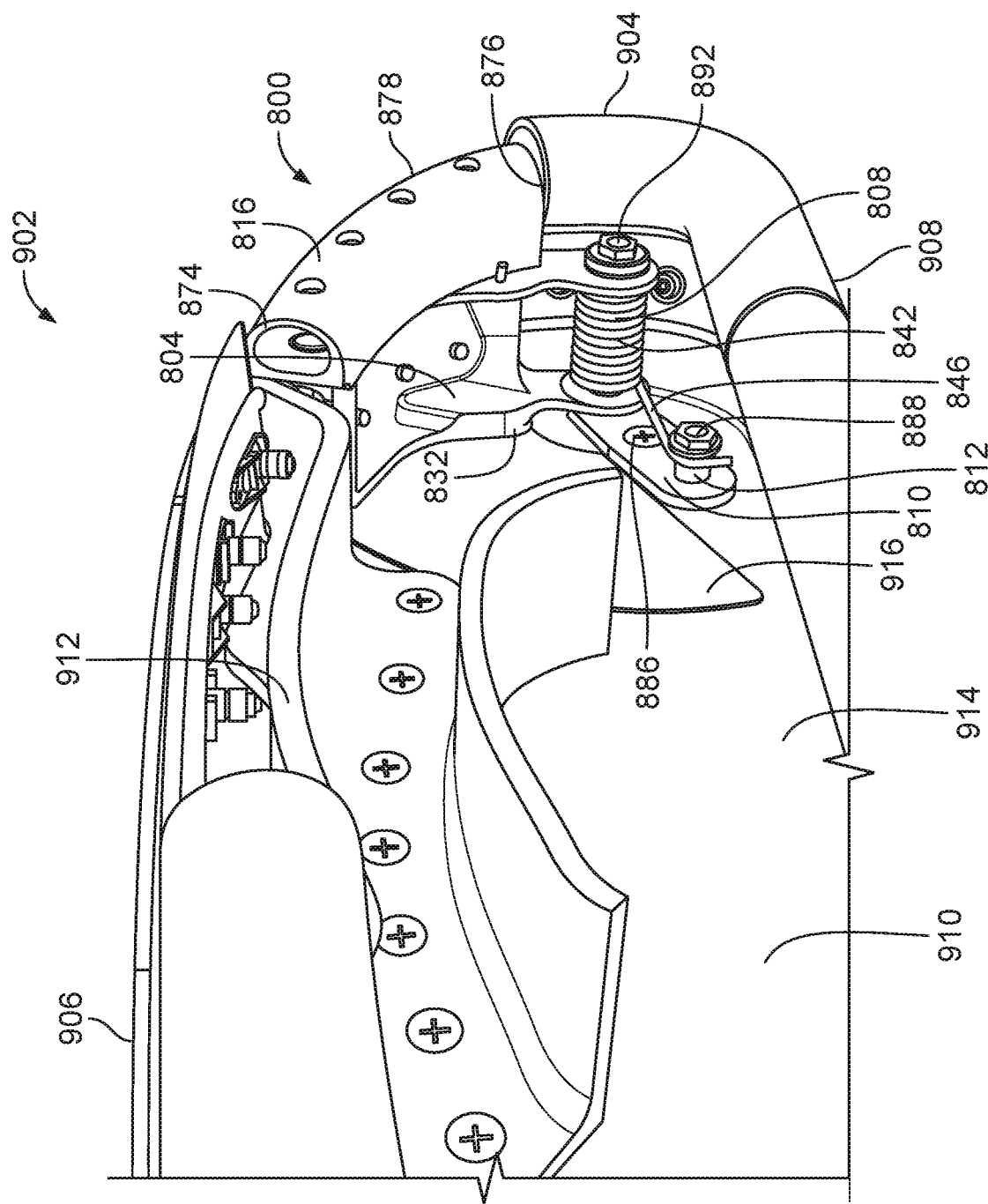
FIG. 10 is a first perspective view of the example outboard flap of FIG. 9 including the example aerodynamic restoration door assembly of FIGS. 8 and 9 in the example deployed position of FIG. 9.
Figure 11:
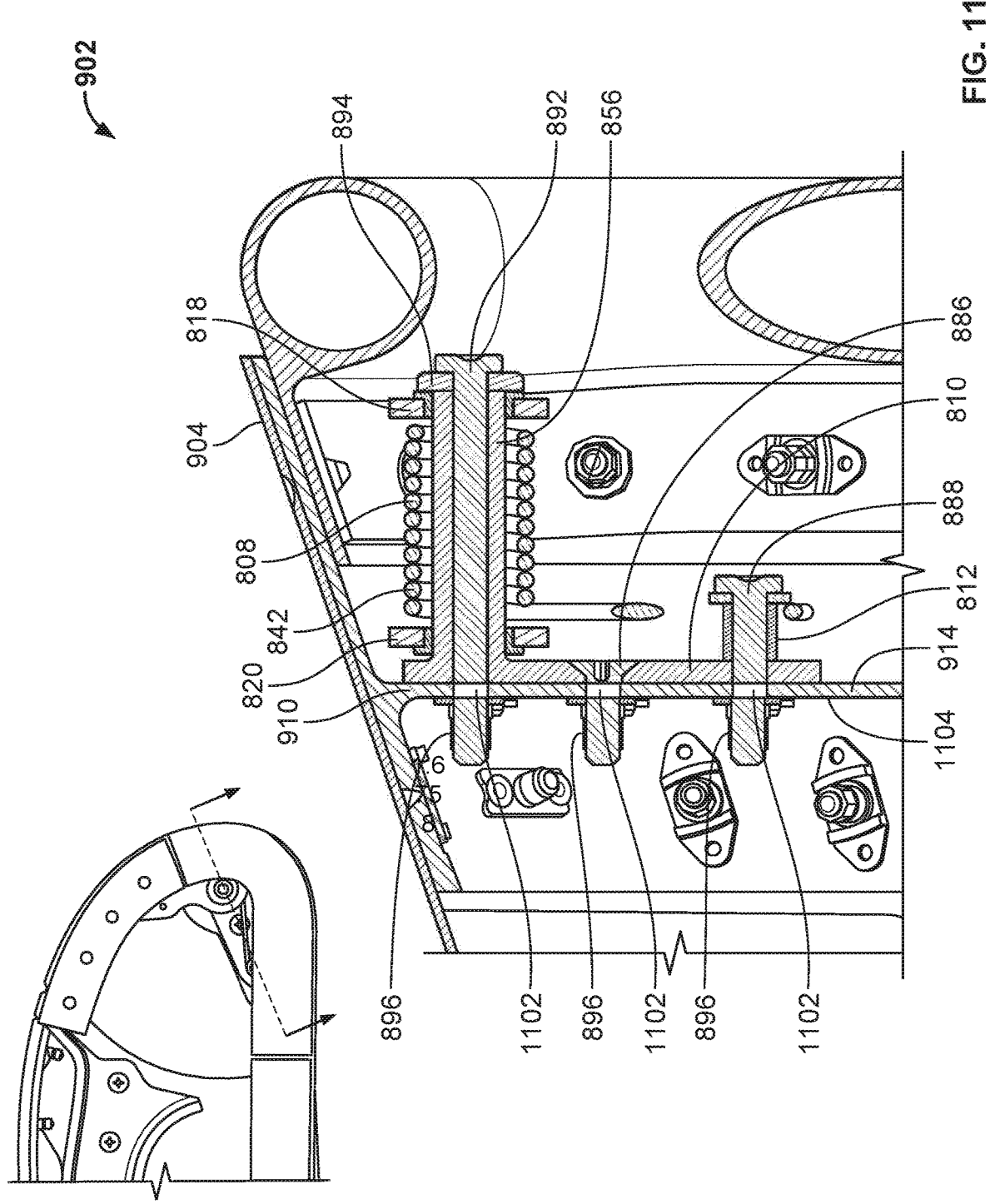
FIG. 11 is a cross-sectional view of the example outboard flap of FIGS. 9 and 10 including the example aerodynamic restoration door assembly of FIGS. 8-10 in the example deployed position of FIGS. 9 and 10.
Figure 12:
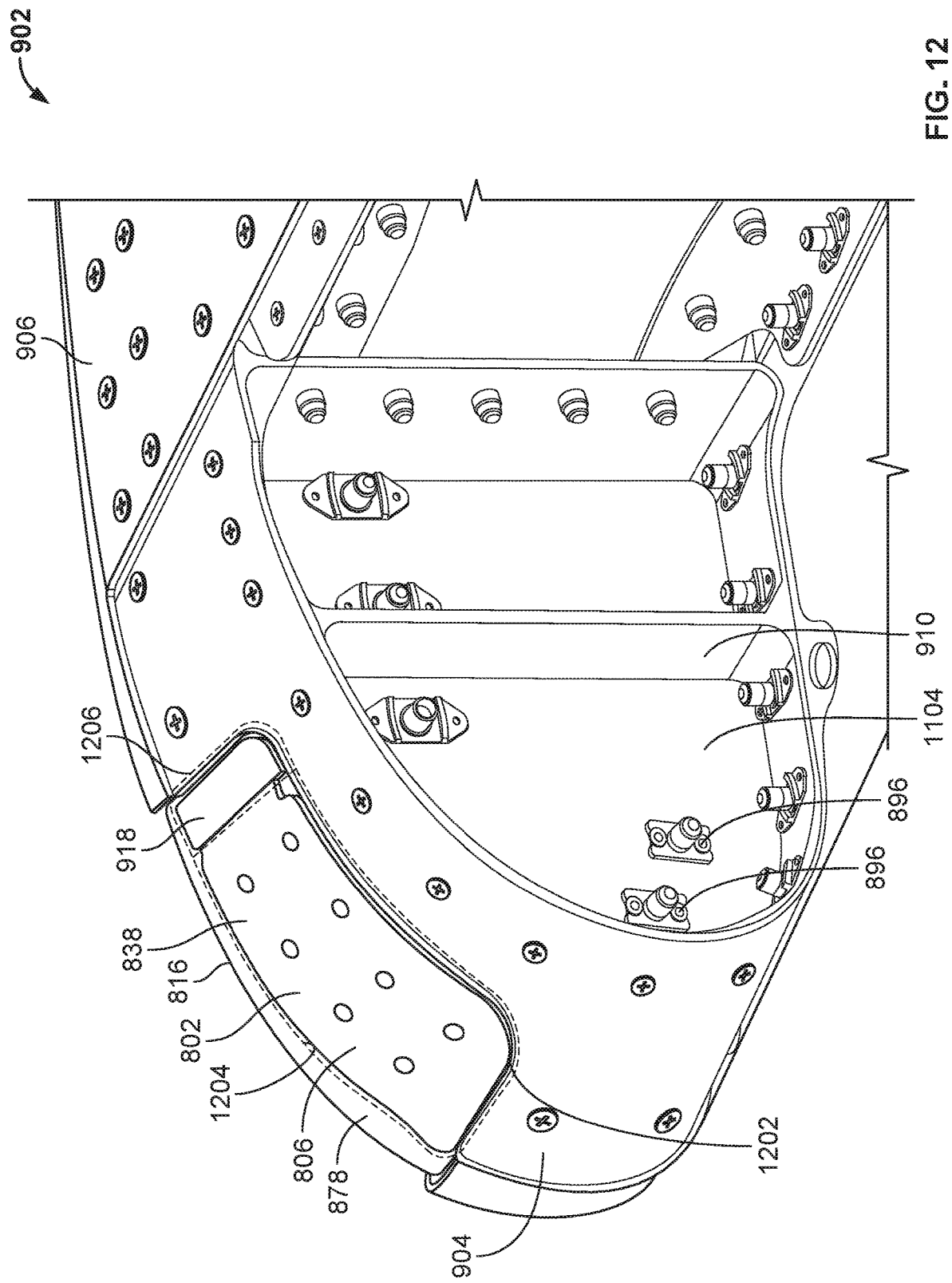
FIG. 12 is a partial cutaway perspective view of the example outboard flap of FIGS. 9-11 including the example aerodynamic restoration door assembly of FIGS. 8-11 in the example deployed position of FIGS. 9-11.

FIGS. 9-13 illustrate various views of an example outboard flap 902 including the example aerodynamic restoration door assembly 800 of FIG. 8 in an example deployed position. FIG. 9 is a side view of the example outboard flap 902 including the example aerodynamic restoration door assembly 800 of FIG. 8 in the example deployed position. FIG. 10 is a first perspective view of the example outboard flap 902 of FIG. 9 including the example aerodynamic restoration door assembly 800 of FIGS. 8 and 9 in the example deployed position of FIG. 9. FIG. 11 is a cross-sectional view of the example outboard flap 902 of FIGS. 9 and 10 including the example aerodynamic restoration door assembly 800 of FIGS. 8-10 in the example deployed position of FIGS. 9 and 10. FIG. 12 is a partial cutaway perspective view of the example outboard flap 902 of FIGS. 9-11 including the example aerodynamic restoration door assembly 800 of FIGS. 8-11 in the example deployed position of FIGS. 9-11. FIG. 13 is a second perspective view of the example outboard flap 902 of FIGS. 9-12 including the example aerodynamic restoration door assembly 800 of FIGS. 8-12 in the example deployed position of FIGS. 9-12. In some examples, the deployed position of the aerodynamic restoration door assembly 800 shown in FIGS. 9-13 and further described below corresponds to the outboard flap 902 of FIGS. 9-16 being deployed (e.g., deployed at a high detent position such as flaps thirty (F30), flaps forty (F40), etc.) relative to an aircraft wing.

Figure 14:
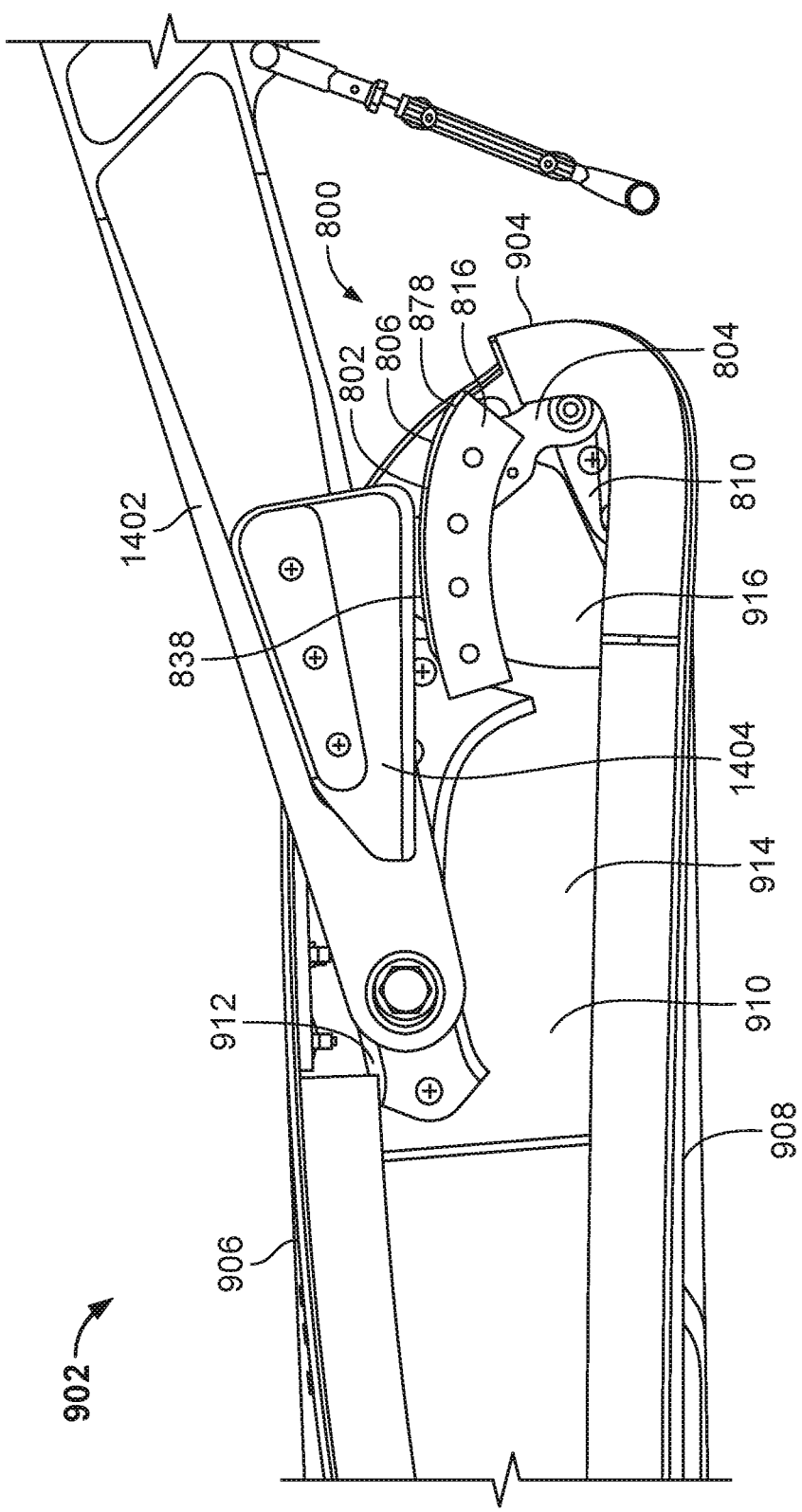
FIG. 14 is a side view of the example outboard flap of FIGS. 9-13 including the example aerodynamic restoration door assembly of FIGS. 8-13 in an example retracted position.

FIGS. 14-16 illustrate various views of the example outboard flap 902 including the example aerodynamic restoration door assembly 800 of FIG. 8 in a retracted position. FIG. 14 is a side view of the example outboard flap 902 of FIGS. 9-13 including the example aerodynamic restoration door assembly 800 of FIGS. 8-13 in the example retracted position. FIG. 15 is a partial cutaway perspective view of the example outboard flap 902 of FIGS. 9-14 including the example aerodynamic restoration door assembly 800 of FIGS. 8-14 in the example retracted position of FIG. 14. FIG. 16 is partial cutaway plan view of the example outboard flap 902 of FIGS. 9-15 including the example aerodynamic restoration door assembly 800 of FIGS. 8-15 in the example retracted position of FIGS. 14 and 15. In some examples, the retracted position of the aerodynamic restoration door assembly 800 shown in FIGS. 14-16 and further described below corresponds to the outboard flap 902 of FIGS. 9-16 being stowed relative to an aircraft wing.

In the illustrated examples of FIGS. 9-16, the outboard flap 902 includes, in addition to the aerodynamic restoration door assembly 800 of FIG. 8, an example leading edge 904, an example cutout or skin void 1202 formed in the leading edge 904, an example trailing edge (not visible in FIGS. 9-16), an example upper surface 906, an example lower surface 908, an example closure rib 910, and an example track 912. The leading edge 904, the cutout or skin void 1202, the trailing edge, the upper surface 906, the lower surface 908, the closure rib 910, and the track 912 of the outboard flap 902 of FIGS. 9-16 correspond, respectively, to the leading edge 128, the first cutout or skin void 510, the trailing edge 130, the upper surface 132, the lower surface 134, the closure rib 136, and the track 138 of the outboard flap 104 of FIGS. 1-7. The outboard flap 902 of FIGS. 9-16 may accordingly be integrated into and/or implemented in connection with the aircraft wing 100 of FIGS. 1-7 described above.

The closure rib 910 of the outboard flap 902 of FIGS. 9-16 is modified relative to the closure rib 136 of the outboard flap 104 of FIGS. 1-7 to include example through holes 1102 extending from an example first surface 914 of the closure rib 910 to an example second surface 1104 of the closure rib 910 located opposite the first surface 914 of the closure rib 910. In the illustrated examples of FIGS. 9-16, the first surface 914 of the closure rib 910 faces toward the door frame 804 and/or the spindle fitting 810 of the aerodynamic restoration door assembly 800 of FIGS. 9-16, and the second surface 1104 of the closure rib 910 faces away from the door frame 804 and/or the spindle fitting 810 of the aerodynamic restoration door assembly 800 of FIGS. 9-16. The spindle fitting 810 of the aerodynamic restoration door assembly 800 is positioned adjacent, on, and/or against the first surface 914 of the closure rib 910 of FIGS. 9-16, and the nut plates 896 of the aerodynamic restoration door assembly 800 are positioned adjacent, on, and/or against the second surface 1104 of the closure rib 910 of FIGS. 9-16. Respective ones of the through holes 1102 of the closure rib 910 of FIGS. 9-16 are aligned (e.g., concentrically aligned) with corresponding respective ones of the nut plates 896 of FIG. 8, and further aligned with corresponding ones of the door frame fastener through hole 858 of the spindle fitting 810 of FIG. 8, the spring tensioner fastener through hole 860 of the spindle fitting 810 of FIG. 8, and the spindle fitting fastener through hole 862 of FIG. 8.

The closure rib 910 of FIGS. 9-16 also includes an example rub sheet 916. In the illustrated examples of FIGS. 9-16, the rub sheet 916 is coupled, fastened, and/or bonded (e.g., via adhesive) to the first surface 914 of the closure rib 910. The rub pad 814 of the aerodynamic restoration door assembly 800 interfaces with (e.g., contacts and/or rubs against) the rub sheet 916 of FIGS. 9-16 as the door frame 804 of the aerodynamic restoration door assembly 800 to which the rub pad 814 is coupled, fastened, and/or bonded moves and/or rotates between the deployed position shown in FIGS. 9-13 and the retracted position shown in FIGS. 14-16. In some examples, the rub sheet 916 of FIGS. 9-16 may be formed from aluminum to provide for a low-friction interface between the rub pad 814 and the rub sheet 916.

The track 912 of the outboard flap 902 of FIGS. 9-16 is modified relative to the track 138 of the outboard flap 104 of FIGS. 1-7 to include an example trim tab 918. The trim tab 918 of the track 912 of FIGS. 9-16 fills and/or aerodynamically restores a portion (e.g., a minor portion) of the cutout or skin void 1202 formed in the leading edge 904 of the outboard flap 902 of FIGS. 9-16. For example, the door skin 806 and/or, more generally, the door 802 of the aerodynamic restoration door assembly 800 may fill and/or aerodynamically restore a first example portion 1204 of the cutout or skin void 1202 when the door skin 806 and/or the door 802 is/are in the deployed position shown in FIGS. 9-13, and the trim tab 918 may fill and/or aerodynamically restore a second example portion 1206 of the cutout or skin void 1202.

The track 912 of the outboard flap 902 of FIGS. 9-16 is sculpted and/or shaped to provide clearance for the movement and/or rotation of the door frame 804, the door skin 806, and/or, more generally, the door 802 of the aerodynamic restoration door assembly 800 between the deployed position shown in FIGS. 9-13 and the retracted position shown in FIGS. 14-16. In the illustrated examples of FIGS. 9-16, the trim tab 918 of the track 912 functions as a stop (e.g., a mechanical stop) to prevent the door skin 806 and/or, more generally, the door 802 of the aerodynamic restoration door assembly 800 from moving and/or rotating past the deployed position shown in FIGS. 9-13 as the door skin 806 and/or the door 802 move and/or rotate away from the retracted position shown in FIGS. 14-16.

The track 912 of the outboard flap 902 of FIGS. 9-16 is also sculpted and/or shaped to receive an example deflection control rib 1402, as shown in FIGS. 14-16. The deflection control rib 1402 of FIGS. 14-16 is modified relative to the deflection control rib 116 of FIGS. 1-7 to include an example depressor 1404. The depressor 1404 is coupled to the deflection control rib 1402 such that the depressor 1404 extends downwardly from the deflection control rib 1402. As shown in FIGS. 14-16, the depressor 1404 contacts the door skin 806 and/or, more generally, the door 802 of the aerodynamic restoration door assembly 800 as the outboard flap 902 is returned from a deployed position to a stowed position. In response to the depressor 1404 of the deflection control rib 1402 contacting the door skin 806 and/or the door 802, the depressor 1404 guides the door skin 806 and/or door 802 from the deployed position shown in FIGS. 9-13 to the retracted position shown in FIGS. 14-16.

In the illustrated examples of FIGS. 9-16, the door 802 of the aerodynamic restoration door assembly 800 is rotatably coupled to the closure rib 910 of the outboard flap 902. The door 802 is moveable between the deployed position shown in FIGS. 9-13 and the retracted position shown in FIGS. 14-16. The cutout or skin void 1202 is formed in the leading edge 904 of the outboard flap 902. The door 802 fills the first portion 1204 of the cutout or skin void 1202 when the door 802 is in the deployed position shown in FIGS. 9-13. The contoured profile of the outer surface 838 of the door 802 is aligned with the contoured profile of the leading edge 904 of the outboard flap 902 when the door 802 is in the deployed position shown in FIGS. 9-13. The bulb seal 816 of the aerodynamic restoration door assembly 800 is coupled to the door 802. The contoured profile of the leading edge 878 of the bulb seal 816 is aligned with the contoured profile of the outer surface 838 of the door 802.

The door 802 is guided from the deployed position shown in FIGS. 9-13 to the retracted position shown in FIGS. 14-16 in response to the door 802 being contacted by the depressor 1404 of the deflection control rib 1402. The deflection control rib 1402 is received in the track 912 in connection with the door 802 being moved into the retraced position shown in FIGS. 14-16. The trim tab 918 of the track 912 fills the second portion 1206 of the cutout or skin void 1202.

In the illustrated examples of FIGS. 9-16, the door 802 includes the door frame 804 and the door skin 806 of the aerodynamic restoration door assembly 800. The door skin 806 is coupled to the door frame 804. The door skin 806 fills the first portion 1204 of the cutout or skin void 1202 when the door 802 is in the deployed position shown in FIGS. 9-13.

In the illustrated examples of FIGS. 9-16, the rub pad 814 of the aerodynamic restoration door assembly 800 is coupled to the door frame 804. The rub pad 814 contacts the rub sheet 916 coupled to the closure rib 910 as the door frame 804 moves and/or rotates between the deployed position shown in FIGS. 9-13 and the retracted position shown in FIGS. 14-16.

In the illustrated examples of FIGS. 9-16, the spindle fitting 810 of the aerodynamic restoration door assembly 800 is coupled to the closure rib 910. The door frame 804 is rotatably coupled to the spindle 856 of the spindle fitting 810. A first one of the nut plates 896 of the aerodynamic restoration door assembly 800 couples the spindle fitting 810 to the closure rib 910. The spindle fitting 810 is positioned adjacent the first surface 914 of the closure rib 910, and the first one of the nut plates 896 is positioned adjacent the second surface 1104 of the closure rib 910.

In the illustrated examples of FIGS. 9-16, the spring tensioner 812 of the aerodynamic restoration door assembly 800 is coupled to the spindle fitting 810. The coiled portion 842 of the torsion spring 808 of the aerodynamic restoration door assembly is coupled to the spindle 856 of the spindle fitting 810. The first arm 844 of the torsion spring 808 is coupled to the door frame 804. The second arm 846 of the torsion spring 808 contacts the spring tensioner 812. The torsion spring 808 biases the door 802 away from the retracted position shown in FIGS. 14-16 and toward the deployed position shown in FIGS. 9-13.

In some examples (e.g., as shown in FIGS. 13, 15 and 16), a first door (e.g., the door 802 of FIGS. 8-16) of an aerodynamic restoration door assembly constructed in the orientation shown and described in connection with FIGS. 8-12 and 14 may be rotatably coupled, fastened, and/or mounted to a first flap (e.g., the outboard flap 902 of FIGS. 9-16) of an aircraft wing, and a second door of an aerodynamic restoration door assembly constructed in an orientation opposite that shown and described in connection with FIGS. 8-12 and 14 may be rotatably coupled, fastened, and or mounted to a second flap (e.g., an inboard flap adjacent the outboard flap) of the aircraft wing. In such examples, the first and second doors may aerodynamically restore respective portions of a first cutout or skin void formed in a leading edge of the first flap and a second cutout or skin void formed in a leading edge of the second flap when the first and second doors are moved into respective deployed positions (e.g., aerodynamic restoration positions) relative to the respective leading edges of the first and second flaps, as shown in FIG. 13.

From the foregoing, it will be appreciated that the disclosed aircraft wing flaps have aerodynamic restoration doors that are movable between a deployed position (e.g., an aerodynamic restoration position) and a retracted position. In some examples, the disclosed aerodynamic restoration doors may be moved and/or rotated into the deployed position in response to the disclosed aircraft wing flaps being deployed (e.g., deployed at a high detent position such as flaps thirty (F30), flaps forty (F40), etc.) relative to an aircraft wing. In some examples, the disclosed aerodynamic restoration doors may be moved and/or rotated into the retracted position in response to the disclosed aircraft wing flaps being stowed relative to the aircraft wing. When the disclosed aerodynamic restoration doors are moved and/or rotated into the deployed position, the aerodynamic restoration doors advantageously fill and/or aerodynamically restore portions (e.g., major portions and/or substantially all) of the cutouts or skin voids respectively formed in the leading edges of the disclosed aircraft wing flaps. The filling and/or aerodynamic restoration of the cutouts or skin voids via the disclosed aerodynamic restoration doors advantageously increases the aerodynamic performance (e.g., decreases drag) associated with the aircraft wing when the disclosed aircraft wing flaps are deployed at low flight speeds and positioned at high detents (e.g., flaps thirty (F30), flaps forty (F40), etc.).

In some examples, an apparatus is disclosed. In some disclosed examples, the apparatus comprises a door to be rotatably coupled to a closure rib of a flap of an aircraft wing. In some disclosed examples, the door is to be moveable between a deployed position and a retracted position. In some disclosed examples, the flap has a leading edge and a cutout formed in the leading edge. In some disclosed examples, the door is to fill a portion of the cutout when the door is in the deployed position.

In some disclosed examples, the door includes an outer surface having a contoured profile. In some disclosed examples, the contoured profile of the outer surface of the door is to be aligned with a contoured profile of the leading edge of the flap when the door is in the deployed position. In some disclosed examples, the apparatus further comprises a bulb seal to be coupled to the door.

In some disclosed examples, the door is to be guided from the deployed position to the retracted position in response to the door being contacted by a depressor of a deflection control rib of the aircraft wing. In some disclosed examples, the deflection control rib is receivable in a track coupled to the closure rib. In some disclosed examples, the track includes a trim tab. In some disclosed examples, the door is to fill a first portion of the cutout when the door is in the deployed position, and the trim tab is to fill a second portion of the cutout.

In some disclosed examples, the door includes a door frame and a door skin to be coupled to the door frame. In some disclosed examples, the door skin is to fill the portion of the cutout when the door is in the deployed position.

In some disclosed examples, the apparatus further comprises a rub pad to be coupled to the door frame. In some disclosed examples, the rub pad is to contact a rub sheet coupled to the closure rib.

In some disclosed examples, the apparatus further comprises a spindle fitting to be coupled to the closure rib. In some disclosed examples, the spindle fitting has a spindle. In some disclosed examples, the door frame is to be rotatably coupled to the spindle.

In some disclosed examples, the apparatus further comprises a nut plate to couple the spindle fitting to the closure rib. In some disclosed examples, the spindle fitting is to be positioned adjacent a first surface of the closure rib. In some disclosed examples, the nut plate is to be positioned adjacent a second surface of the closure rib located opposite the first surface of the closure rib.

In some disclosed examples, the door frame includes a stop. In some disclosed examples, the stop is to prevent the door frame from moving past the spindle fitting as the door is moved from the deployed position toward the retracted position.

In some disclosed examples, the apparatus further comprises a spring tensioner to be coupled to the spindle fitting. In some disclosed examples, the apparatus further comprises a torsion spring including a coiled portion, a first arm extending from the coiled portion, and a second arm extending from the coiled portion. In some disclosed examples, the coiled portion is to be coupled to the spindle. In some disclosed examples, the first arm is to be coupled to the door frame. In some disclosed examples, the second arm is to contact the spring tensioner. In some disclosed examples, the torsion spring is to bias the door away from the retracted position and toward the deployed position.

In some examples, a flap of an aircraft wing is disclosed. In some disclosed examples, the flap comprises a leading edge having a cutout. In some disclosed examples, the flap further comprises a closure rib. In some disclosed examples, the flap further comprises a door rotatably coupled to the closure rib and moveable between a deployed position and a retracted position. In some disclosed examples, the door is to fill a portion of the cutout when the door is in the deployed position.

In some disclosed examples, the door includes an outer surface having a contoured profile. In some disclosed examples, the contoured profile of the outer surface of the door is to be aligned with a contoured profile of the leading edge of the flap when the door is in the deployed position. In some disclosed examples, the flap further comprises a bulb seal coupled to the door.

In some disclosed examples, the door is to be guided from the deployed position to the retracted position in response to the door being contacted by a depressor of a deflection control rib of the aircraft wing. In some disclosed examples, the flap further comprises a track coupled to the closure rib. In some disclosed examples, the deflection control rib is receivable in the track. In some disclosed examples, the track includes a trim tab. In some disclosed examples, the door is to fill a first portion of the cutout when the door is in the deployed position, and the trim tab is to fill a second portion of the cutout.

In some examples, a method is disclosed. In some disclosed examples, the method comprises moving a door rotatably coupled to a closure rib of a flap of an aircraft wing from a retracted position to a deployed position to fill a portion of a cutout formed in a leading edge of the flap.

In some disclosed examples of the method, the door includes an outer surface having a contoured profile. In some disclosed examples, the contoured profile of the outer surface of the door is aligned with a contoured profile of the leading edge of the flap when the door is in the deployed position.

In some disclosed examples, the method further comprises guiding the door from the deployed position to the retracted position by contacting the door with a depressor of a deflection control rib of the aircraft wing.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   a door rotatably coupled to a closure rib of a flap of an aircraft wing, the door moveable between a deployed position and a retracted position, the flap having a leading edge and a cutout formed in the leading edge, the door filling a first portion of the cutout when the door is in the deployed position; and
   a track coupled to the closure rib, the track including a trim tab, the trim tab filling a second portion of the cutout, the track receiving a deflection control rib of the aircraft wing when the flap is in a stowed position.

2. The apparatus of claim 1, wherein the door includes an outer surface having a contoured profile, the contoured profile of the outer surface of the door aligned with a contoured profile of the leading edge of the flap when the door is in the deployed position.

3. The apparatus of claim 2, further comprising a bulb seal coupled to the door.

4. The apparatus of claim 1, wherein the door is guided from the deployed position to the retracted position in response to the door being contacted by a depressor, the depressor coupled to and extending downward from the deflection control rib.

5. The apparatus of claim 1, wherein the door includes a door frame and a door skin coupled to the door frame, the door skin filling the first portion of the cutout when the door is in the deployed position.

6. The apparatus of claim 5, further comprising a rub pad coupled to the door frame, the rub pad contacting a rub sheet coupled to the closure rib.

7. The apparatus of claim 5, further comprising a spindle fitting coupled to the closure rib, the spindle fitting having a spindle, the door frame rotatably coupled to the spindle.

8. The apparatus of claim 7, further comprising a nut plate coupling the spindle fitting to the closure rib, the spindle fitting positioned adjacent a first surface of the closure rib, the nut plate positioned adjacent a second surface of the closure rib located opposite the first surface of the closure rib.

9. The apparatus of claim 7, wherein the door frame includes a stop, the stop preventing the door frame from moving past the spindle fitting as the door is moved from the deployed position toward the retracted position.

10. The apparatus of claim 7, further comprising a spring tensioner coupled to the spindle fitting.

11. The apparatus of claim 10, further comprising a torsion spring including a coiled portion, a first arm extending from the coiled portion, and a second arm extending from the coiled portion, the coiled portion coupled to the spindle, the first arm coupled to the door frame, the second arm contacting the spring tensioner, the torsion spring biasing the door away from the retracted position and toward the deployed position.

12. The apparatus of claim 1, wherein the trim tab includes a mechanical stop, the mechanical stop preventing the door from moving past the deployed position as the door moves away from the retracted position.

13. The apparatus of claim 1, wherein the deflection control rib extends through the first portion of the cutout and into the track when the door is in the retracted position and the flap is in the stowed position.

14. A flap of an aircraft wing, the flap comprising:
   a leading edge having a cutout;
   a closure rib;
   a door rotatably coupled to the closure rib and moveable between a deployed position and a retracted position, the door filling a first portion of the cutout when the door is in the deployed position; and
   a track coupled to the closure rib, the track including a trim tab, the trim tab filling a second portion of the cutout, the track receiving a deflection control rib of the aircraft wing when the flap is in a stowed position.

15. The flap of claim 14, wherein the door includes an outer surface having a contoured profile, the contoured profile of the outer surface of the door aligned with a contoured profile of the leading edge of the flap when the door is in the deployed position.

16. The flap of claim 15, further comprising a bulb seal coupled to the door.

17. The flap of claim 14, wherein the door is guided from the deployed position to the retracted position in response to the door being contacted by a depressor, the depressor coupled to and extending downward from the deflection control rib.

18. A method, comprising:
   moving a door rotatably coupled to a closure rib of a flap of an aircraft wing from a retracted position to a deployed position, the door filling a first portion of a cutout formed in a leading edge of the flap when the door is in the deployed position, the cutout including a second portion filled by a trim tab of a track, the track coupled to the closure rib, the track receiving a deflection control rib of the aircraft wing when the flap is in a stowed position.

19. The method of claim 18, wherein the door includes an outer surface having a contoured profile, the contoured profile of the outer surface of the door being aligned with a contoured profile of the leading edge of the flap when the door is in the deployed position.

20. The method of claim 18, further comprising guiding the door from the deployed position to the retracted position by contacting the door with a depressor, the depressor coupled to and extending downward from the deflection control rib.

* * * * *